United States Patent [19]
Gutman

[11] Patent Number: 5,307,676
[45] Date of Patent: * May 3, 1994

[54] CONTROLLABLE GEAR TESTING SYSTEM

[75] Inventor: Yevsey Gutman, Minneapolis, Minn.

[73] Assignee: GEI Systems, Inc., Minneapolis, Minn.

[*] Notice: The portion of the term of this patent subsequent to May 4, 2010 has been disclaimed.

[21] Appl. No.: 929,151

[22] Filed: Aug. 12, 1992

[51] Int. Cl.$^5$ .................. G01M 13/02; B23Q 3/04; B23Q 3/06; B23Q 1/04
[52] U.S. Cl. ................... 73/162; 33/501.13; 33/573; 269/71
[58] Field of Search ............... 33/501.13, 573; 73/162; 269/71, 73

[56] References Cited

U.S. PATENT DOCUMENTS

| | | | |
|---|---|---|---|
| 1,981,693 | 11/1934 | Firestone et al. | 33/501.13 |
| 3,099,901 | 8/1963 | Hunkeler | 51/26 |
| 3,176,512 | 4/1965 | Hediger | 73/162 |
| 3,321,840 | 5/1967 | Pedersen | 33/179.5 |
| 3,404,443 | 10/1968 | Cinanni | 29/90 |
| 3,496,490 | 2/1970 | Weinert et al. | 33/501.13 |
| 3,528,286 | 9/1970 | Bergemann et al. | 73/162 |
| 3,611,800 | 10/1971 | Howlett et al. | 73/162 |
| 3,686,801 | 8/1972 | Ellwanger | 51/215 R |
| 3,712,000 | 1/1973 | Spear | 51/287 |
| 3,717,958 | 2/1973 | Ellwanger et al. | 51/26 |
| 3,795,143 | 3/1974 | Deprez et al. | 73/162 |
| 3,990,689 | 11/1976 | Eklund, Sr. | 269/71 |
| 4,024,757 | 5/1977 | Raess et al. | 73/162 |
| 4,193,317 | 3/1980 | Oono et al. | 269/71 |
| 4,262,891 | 4/1981 | Kinney | 269/71 |
| 4,317,560 | 3/1982 | Troyer | 269/71 |
| 4,502,457 | 3/1985 | Marron | 269/71 |
| 4,618,256 | 10/1986 | Bartolomeo | 356/23 |
| 4,705,447 | 11/1987 | Smith | 269/71 |
| 4,767,109 | 8/1988 | Raketich | 269/71 |
| 4,831,872 | 5/1989 | Huang et al. | 73/162 |

OTHER PUBLICATIONS

Oerlikon Spriomatic contex T20 CNC Bevel and Hypoid Gear Tester by Dr. Hermann J. Stadtfeld, Dec. 1990.
Gleason No. 512 Hypoid Tester, Nov. 1969.
Bevel Gear Lapping Machine LKR 851 and LKR 1600, as well as Bevel Gear Running Testers GKP 851 and GKP 1600 by Klingelnberg (Date Unknown).
Bevel Gear Running Testers by Klingelnberg (Date Unknown).
General Line Brochure, The Gleason Works, 1990.
The Institute of Mechanical Engineers, *A Platform with Six Degrees of Freedom*, by D. Steward, Proceedings 1965-66 –vol. 180, Part 1, No. 15, pp. 371-386.
*Understanding the 513 Bevel Gear Test Machine*, The Gleason Works, pp. 1-1, 4-2 through 4-3 and accompanying figures (Date Unknown).

*Primary Examiner*—Diego F. F. Gutierrez
*Attorney, Agent, or Firm*—Westman, Champlin & Kelly

[57] ABSTRACT

A gear testing machine for evaluating the performance of a set of gears including a base support platform that mounts a pinion for movement in at least two mutually perpendicular axes, and permits fixing the pinion in place. The gear is then mounted relative to the pinion through controllable actuators attached to the frame so that the gear support can be positioned at a desired location relative to the pinion spindle axis to compensate for errors in mounting and to provide for very accurate mounting in accordance with specified parameters. The position of the gear carriage can be changed during a testing sequence when the gears are being run to observe changes in parameters on the gears.

31 Claims, 22 Drawing Sheets

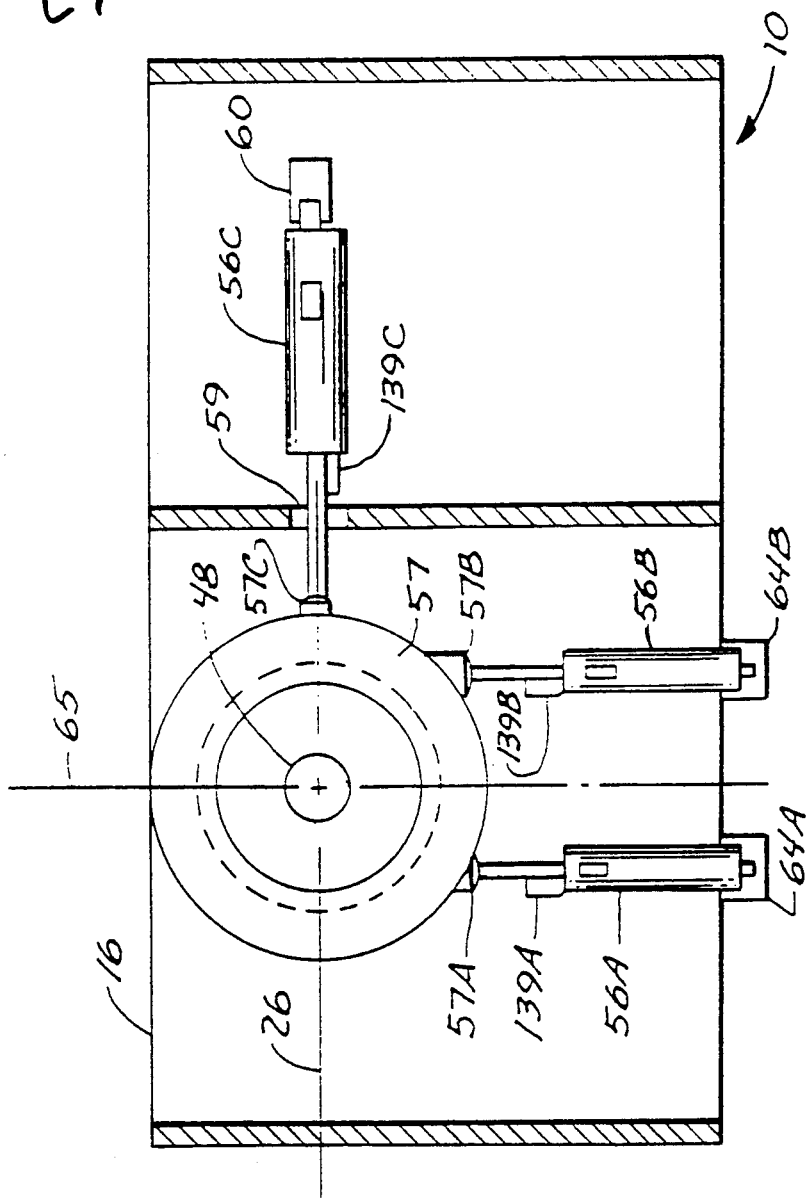

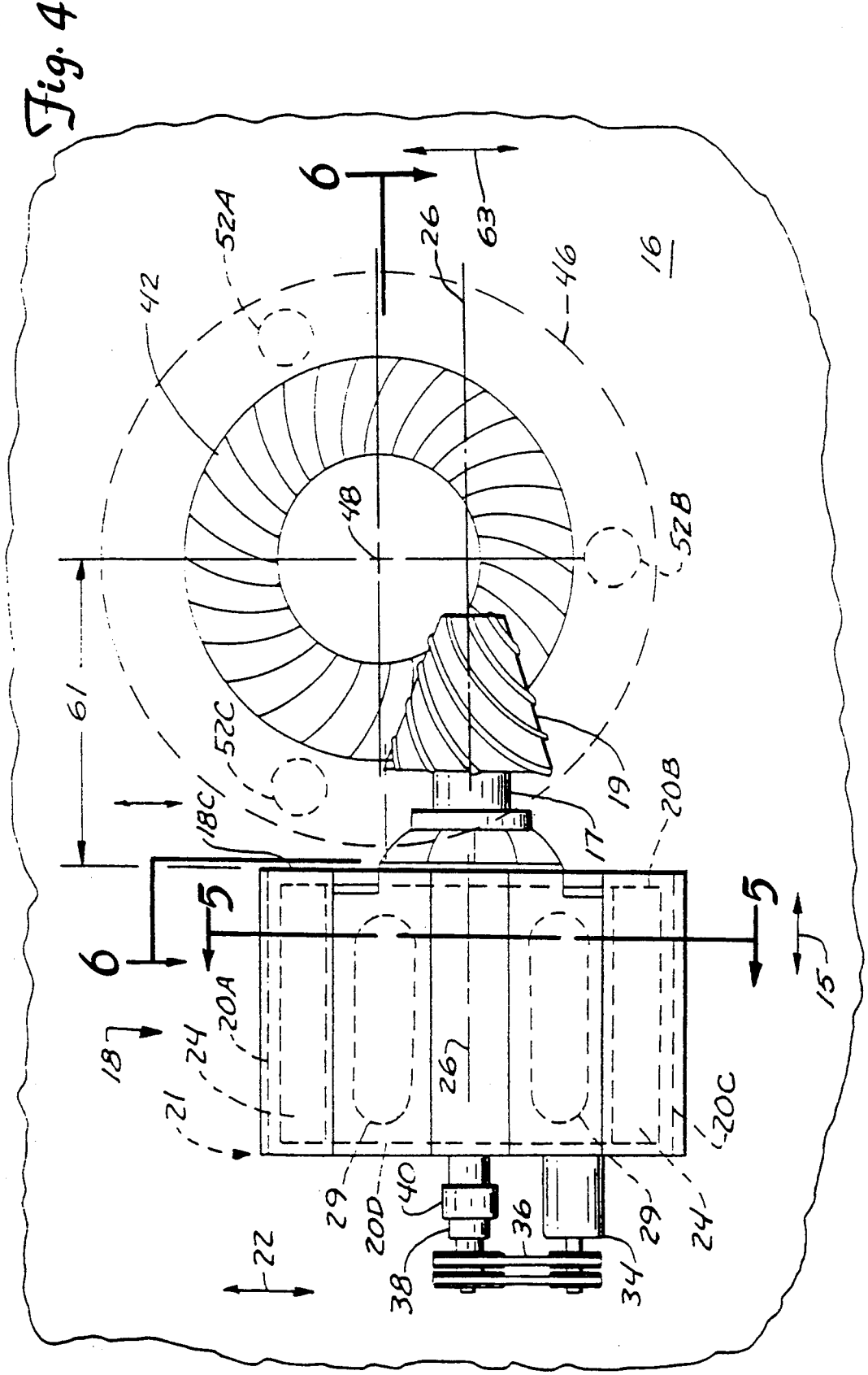

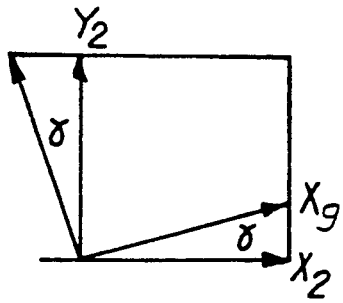

$$M_{2g} = \begin{bmatrix} COS(\gamma) & -SIN(\gamma) & 0 & 0 \\ SIN(\gamma) & COS(\gamma) & 0 & 0 \\ 0 & 0 & 1 & 0 \\ 0 & 0 & 0 & 1 \end{bmatrix}$$

Fig. 26

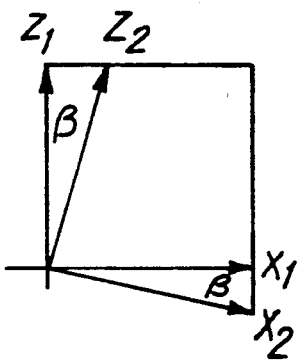

$$M_{1,2} = \begin{bmatrix} COS(\beta) & 0 & SIN(\beta) & 0 \\ 0 & 1 & 0 & 0 \\ -SIN(\beta) & 0 & COS(\beta) & 0 \\ 0 & 0 & 0 & 1 \end{bmatrix}$$

Fig. 27

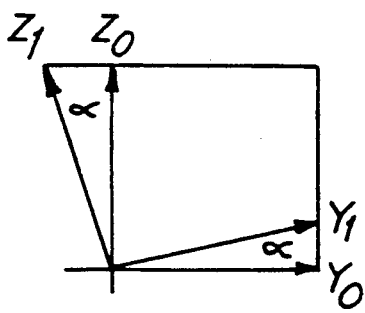

$$M_{0,1} = \begin{bmatrix} 1 & 0 & 0 & 0 \\ 0 & COS(\alpha) & -SIN(\alpha) & 0 \\ 0 & SIN(\alpha) & COS(\alpha) & 0 \\ 0 & 0 & 0 & 1 \end{bmatrix}$$

Fig. 28

$$M_{0,g} = \begin{bmatrix} C\beta.C\gamma & -C\beta.S\gamma & S\beta & 0 \\ C\alpha.S\gamma + S\alpha.S\beta.C\gamma & C\alpha.C\gamma - S\alpha.S\beta.S\gamma & -S\alpha.C\beta & 0 \\ S\alpha.S\gamma - C\alpha.S\beta.C\gamma & S\alpha.C\gamma - C\alpha.S\beta.S\gamma & C\alpha.C\beta & 0 \\ 0 & 0 & 0 & 1 \end{bmatrix}$$

CONTROLLABLE GEAR TESTING SYSTEM

BACKGROUND OF THE INVENTION

The present application relates to gear testing, and a way of mounting a first gear relative to a second gear to provide six degrees of freedom for positioning the first gear properly to obtain the correct orientation relative to the second gear, and maintaining or changing the orientation in real time.

SUMMARY OF THE INVENTION

The present invention relates to a controllable frame for holding a first gear spindle support head and a second gear spindle support used for driving the gear during various test operations. Although the present invention will be described with respect to a hypoid or spiral bevel gear tester, principals forming the present invention are equally suited for testing other types of gears. Therefore, it is to be understood that the present invention is not limited to nor intended to be limited to a gear tester for hypoid or spiral bevel gears.

Embodied as a hypoid or spiral bevel gear tester, the present invention includes a base that mounts a pinion spindle in an adjustable but operationally fixed position relative to a gear spindle head, so that the pinion can be placed into a frame of reference that is close to the correct placement with the gear in a centered or reference position. The gear spindle head is mounted with six actuators, three of which operate in generally vertical directions, and three of which operate in generally horizontal directions for providing six degrees of freedom. Variable mounting parameters control the actuators to position the gear relative to the pinion statically as well as dynamically during testing for proper test operations.

The system provides a high degree of stiffness, and real-time changing of the mounting parameters to accommodate changing conditions or procedures. In one form of the invention, direct support of the gear carriage on the actuators is provided, and in another form of the invention intermediate struts between the actuators and the gear housing are provided. In either arrangement, precise control is obtained, and whether or not struts are used depends on space limitations, and tolerance of the system to side forces when the gear spindle carriage has been displaced during operation.

Additionally, the actuators are made so that they can have a sufficient stroke to permit loading and unloading of the gear from the gear spindle carriage or head relatively rapidly, but yet provide very fine adjustments and very precise movements when the final positioning of the gear is to be made.

The control of the system is through servo controls using feedback sensors capable of providing very fine movement to the gear in all of the degrees of freedom so that the gear is held precisely relative to the pinion during testing. The feedback sensors that are utilized on the gear spindle support head provide position feedback information to known computer controls for actuating servo valves on the actuators.

BRIEF DESCRIPTION OF THE DRAWINGS

FIG. 2 is a sectional view taken on line 2—2 in FIG. 1;

FIG. 4 is a top view of the gear tester of FIGS. 1 or 3 with parts broken away;

FIGS. 25-31 are vector diagrams illustrating relative positions of the gear and the pinion;

DETAILED DESCRIPTION OF THE PREFERRED EMBODIMENTS

Figure 1:
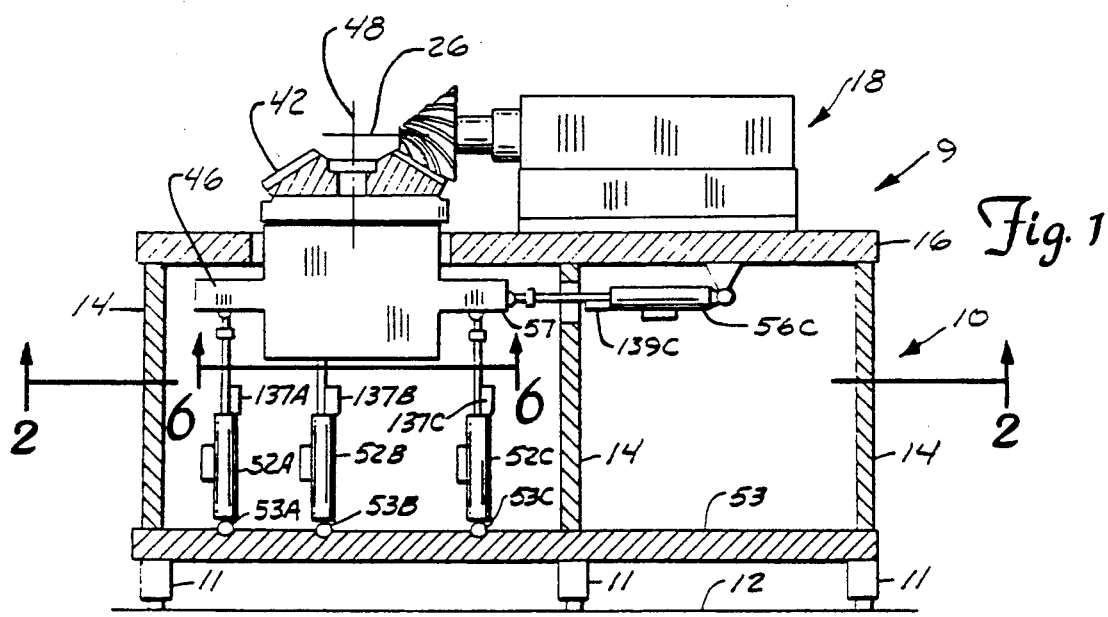
FIG. 1 is a side-elevational view with parts in section and parts broken away of a platform support for a gear tester made according to the present invention.
Figure 5:
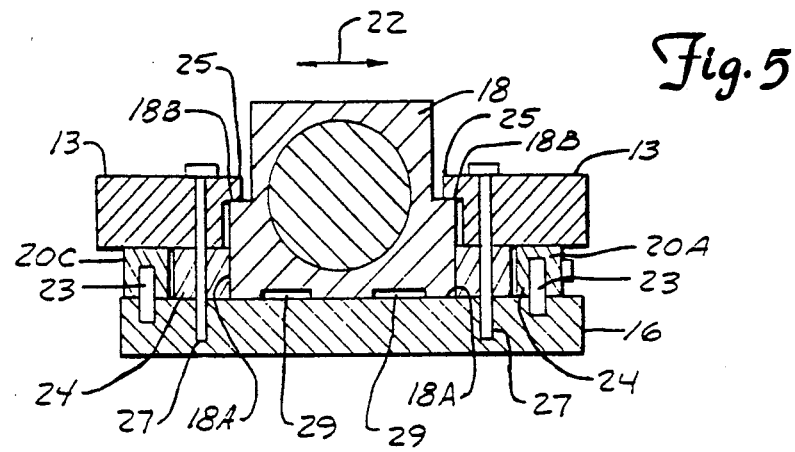
FIG. 5 is a sectional view of a portion of the tester taken on line 5—5 of FIG. 4.

FIG. 1 illustrates a gear tester 9 of the present invention. The gear tester 9 includes a test frame 10 having suitable supports 11 that support elements of the gear tester 9 relative to a floor surface 12. The frame 10 further includes upright members or walls 14, which support a horizontal tabletop 16, on which a pinion spindle housing 18 is adjustably mounted for coarse or nominal settings to be described below. Referring to FIGS. 4 and 5, the pinion spindle housing 18 is located within four guide rails 20A, 20B, 20C and 20D that are connected together to form a guide rail frame 21. The guide rail frame 21 is secured to the table 16 with mounting pegs 23. Replaceable spacer bars 24 are disposed between side edges 18A of the pinion spindle housing 18 and the side guide rails 20A and 20C orient the pinion spindle housing 18 substantially parallel to a desired longitudinal axis 26 of a pinion spindle 17 and pinion 19 for nominal settings. Typically, the pinion 19 and its shaft 17 are manufactured as a single piece.

Clamping bars 13 positioned over the side guide rails 20A and 20C and the spacer bars 24 secure the pinion spindle housing 18 to the table 16. Each clamping bar 13 includes an extending edge 25 that engages corresponding flanges 18B of the pinion spindle housing 18. Mounting bolts 27 through the clamping bars 13 and the spacer bars 24 secure the position of the pinion spindle housing 18 to the table 16. As illustrated, sufficient contact between the clamping bars 13 and the pinion spindle housing 18 is maintained on flanges 18B, while allowing the spacer bars 24 to be replaced when desired to allow transverse movement of the pinion spindle housing 18 in the directions indicated by double arrow 22 to obtain the nominal settings. In addition, the pinion spindle housing 18 has a longitudinal length less than the distance between guide rails 20B and 20D to allow longitudinal positioning of the pinion spindle housing 18 in the directions indicated by double arrow 15 to obtain the nominal settings.

In the embodiment as illustrated, positioning of the pinion spindle housing 18 is made easier through pneumatic lifts. With the clamping bars 13 removed, air from a suitable compressor, not shown, is forced into recesses 29 formed within the base plate of the pinion spindle housing 18. The forced air within recesses 29 causes upward movement of the pinion spindle housing 18, allowing convenient relocation of the pinion spindle housing 18 on the table 16. When the desired position of the pinion spindle housing 18 has been obtained, air pressure is removed within recesses 29 to lower the pinion spindle housing 18 onto the table 16. As described above, suitable spacer bars 24 are then located between the pinion spindle housing 18 and the guide rails with the clamping bars 13 securing the assembly to the table 16.

Pinion spindle housing 18 further carries a motor of suitable power indicated generally at 34. The motor 34 drives a pulley and belt drive 36, which in turn drives a shaft 38 that is coupled to the pinion spindle 17. An optical shaft speed encoder 40 is provided to determine the pinion spindle rotational speed. The motor 34 is controllable as to speed and has adequate power to load the pinion 19 as well as a gear indicated generally at 42 that are to be tested.

Figure 6:
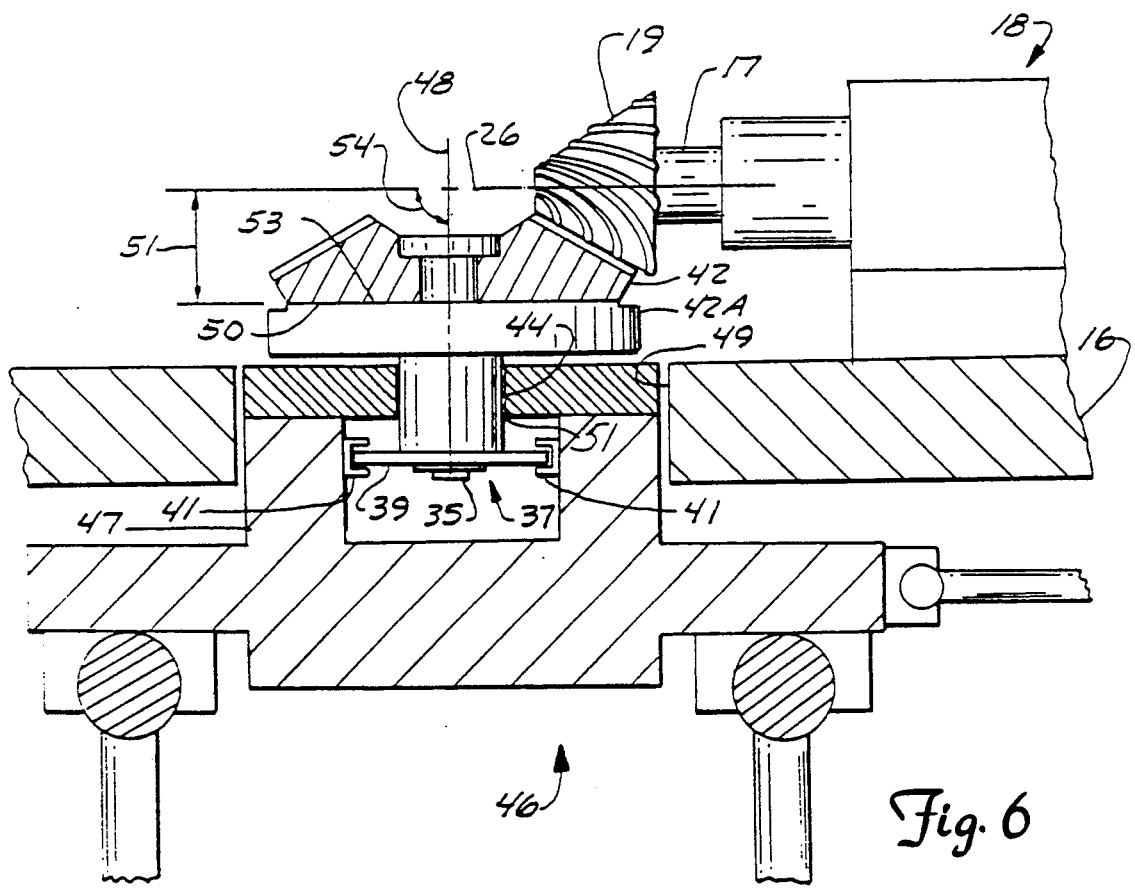
FIG. 6 is an enlarged sectional view of a portion of the tester taken on line 6—6 of FIG. 1.

As shown in FIG. 6, the gear spindle 44 is rotatably mounted with suitable bearings in a gear carriage 46. The gear carriage 46 has a body portion 47 that extends upwardly through an opening 49 in the table 16 that is larger than the body portion 47 so there is clearance. A gear support head or plate 42A is drivably coupled to the spindle 44 and in turn drivably supports the gear 42 which meshes with the pinion 19. The pinion 19 can be for a spiral bevel gear, or a hypoid gear, so that there could be an offset, commonly called the hypoid offset or vertical position ("V") 63. The hypoid offset 63 is the distance between the pinion 19 and a plane passing through the gear axis 48 and parallel to the axis 26 of the pinion spindle 17. The gear carriage 46 is independent of the table 16, but is supported relative thereto, and in this instance the gear carriage 46 is supported with six degrees of freedom relative to the fixed position of the pinion 19, after nominal settings have taken place.

A gear back surface indicated at 50 of gear 42 is also mounted by a distance from the pinion axis 26. This distance, indicated by the arrow 51, is commonly known as the gear mounting distance, which determines the backlash ("Q"). An angle indicated by arrow 54, between the gear axis 48 and the plane containing the pinion axis 26 is known as the shaft angle ("S").

Rotational sensors are provided to measure rotation of the pinion 19 and the gear 42. The motor encoder 40 has been previously described and determines the rotational speed of pinion 19. The gear spindle 44 has an optical encoder indicated schematically at 35 in FIG. 6. The spindle 44 further includes a brake assembly 37 to load the gear 42 and the pinion 19. Brake assembly 37 comprises a brake disc 39 and calibers 41.

The gear carriage 46 is mounted relative to table 16 with supports that give six degrees of freedom. Referring to FIGS. 1 and 4, the gear carriage 46 is mounted for movement along or parallel to axis 48 on three actuators 52A, 52B and 52C that are mounted to a lower platform 53 of support structure 10 using universal pivotal mounting (spherical bearings) 53A, 53B and 53C, respectively, preferably separated from each other by 120 degrees. The rods of the actuators 52A-52C are mounted to a ring or flange 57 on the gear carriage 46.

The actuators 52A-52C adjust the gear mounting distance 52 and the shaft angle 54. Simultaneous operation of the actuators 52A-52C to drive their respective rods in movement parallel to the gear axis 48 adjusts the gear mounting distance 52 and thus the amount of backlash between the gear 42 and the pinion 19. Whereas, differential movement of the actuators 52A-52C adjusts the shaft angle 54.

Referring to FIGS. 1 and 2, additional movement of the gear carriage 46 and the gear 42 with respect to the fixed pinion 19 is obtained through operation of actuators 56A, 56B and 56C. The actuators 56A, 56B and 56C act along the two mutually perpendicular axes of the gear back face 50.

As shown in FIG. 2 schematically, the actuators 56A and 56B are parallel to each other and spaced on opposite sides of a plane defined by axes 65 and 48. The rods of actuators 56A and 56B are connected to flange 57 through universal pivot or spherical connection joints 57A and 57B, respectively. At ends opposite connection joints 57A and 57B, the actuators 56A and 56B are secured to support structure 10 using suitable brackets 64A and 64B. In contrast, the other actuator 56C operates in a direction generally perpendicular to axis 65 and parallel to the pinion spindle axis 26. Like the actuators 56A and 56B, the rod of actuator 56C is connected with a universal connection joint 57C. An aperture 59 is provided in center wall 14 to allow the rod of actuator 56C to project therethrough.

The actuator 56C controls movement of the gear carriage 46 in a direction indicated by arrow 61 in FIG. 4, which is the distance of the gear axis 48 from a reference plane on the pinion spindle 17, typically referred to as the horizontal or pinion axial position ("H"). Whereas, the actuators 56A and 56B control movement of the gear carriage 46 indicated by arrow 63 when operated simultaneously in the same direction. However, differential movement of the actuators 56A and 56B will rotate the gear carriage slightly about the axis 48, but this is not critical to operation because the gear 42 will be driven about this axis. Each actuator 56A-56C can be operated with servocontrol valves. It should be understood that the terminology for horizontal and vertical positions are traditional references used in describing relative pinion and gear positions and are not intended to be limitations of the present invention.

Figure 3:
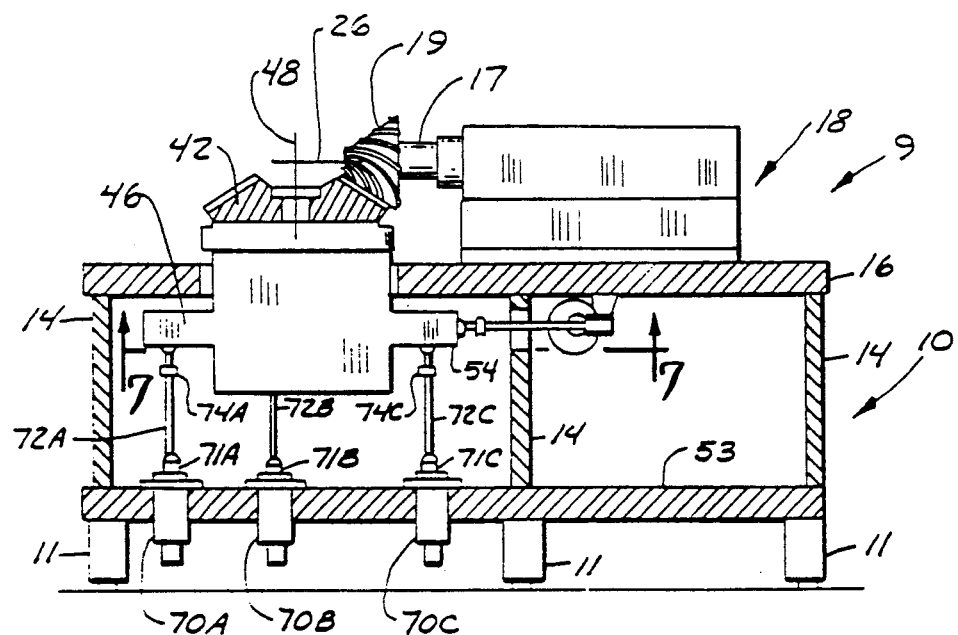
FIG. 3 is a side elevational view similar to FIG. 1 showing an alternative embodiment of actuators utilizing elongated struts for moving a gear support carriage.

A modified form of the actuators for controlling the gear carriage 46 is illustrated in FIG. 3. The gear carriage 46 is supported in substantially the same manner, except that the actuators utilized include substantially non-compressible load sensing links so that the actuators can be fixed to the support frame 10 and the weight of each actuator does not have to be carried by the gear carriage 46.

Referring to FIG. 3, the vertical actuators 70A, 70B and 70C are fixedly mounted onto the lower plate 53 of the frame 10. Each of these actuators has a suitable rod 71A, 71B and 71C, respectively, that is universally pivotally connected to one end of a respective load link or fixed length strut 72A, and 72C. The struts 72A-72C in turn are connected to the flange 57 of the gear carriage 46 through universal pivotal connections. Each of the struts can contain a load cell, for example, 74A-74C or, as will be explained, a special load sensing arrangement can be used.

Figure 7:
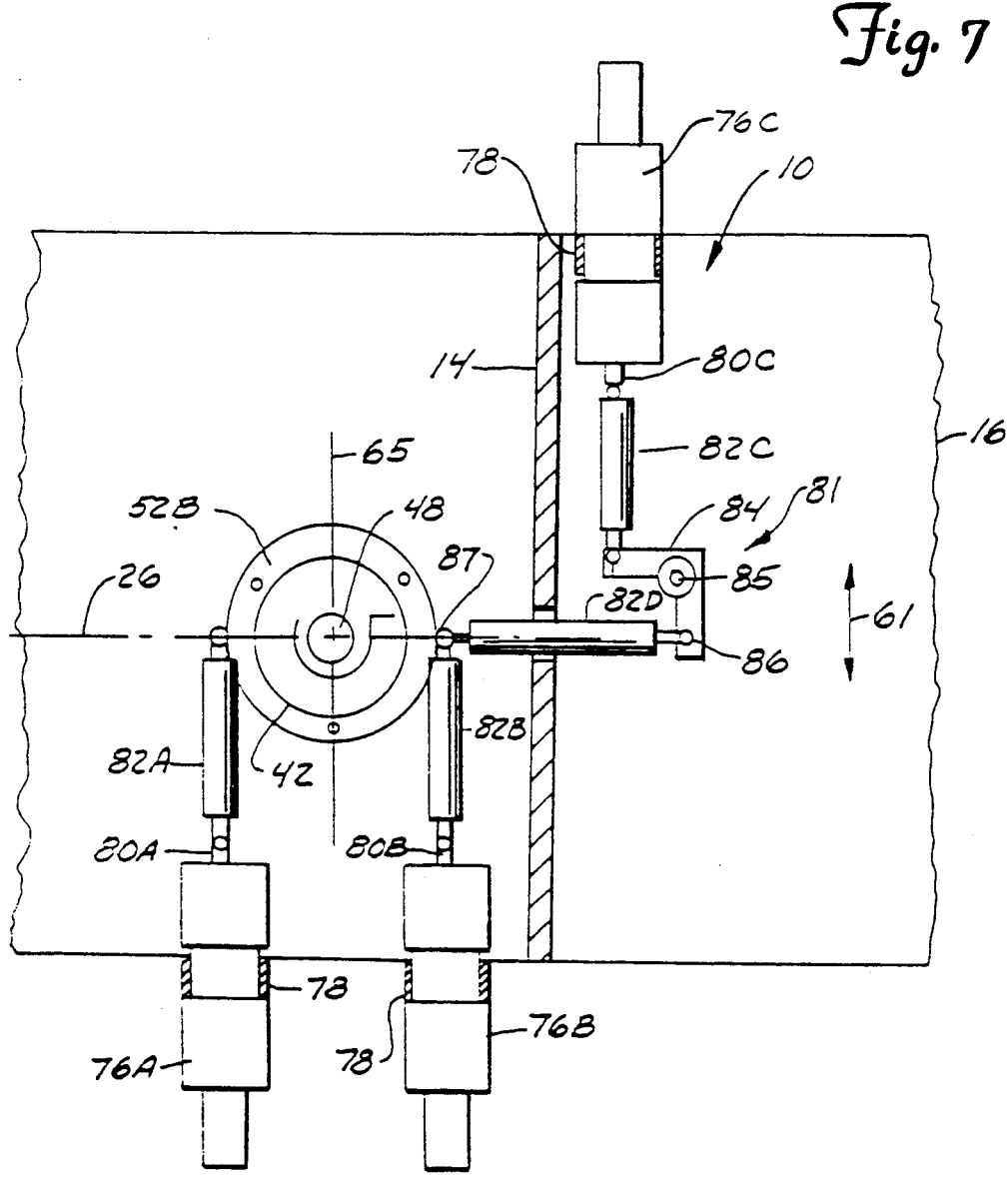
FIG. 7 is a sectional view taken on line 7—7 in FIG. 3.

Horizontal plane positioning of the gear carriage is controlled by actuators 76A, 76B and 76C, as illustrated in FIG. 7. Actuators 76A, 76B and 76C are supported with suitable clamps or brackets 78 to the tabletop 16. The actuators 76A, 76B and 76C have rods 80A, 80B and 80C, that in turn are pivotally connected to loading links or fixed length struts 82A, 82B and 82C that act in a direction generally at right angles to the axes of operation of the struts 72A, 72B and 72C. The struts 82A-82C are universally pivotally mounted to the flange 57 of the gear carriage 46 as well as each corresponding actuator.

The ability to use the struts 72A-72C and 82A-82C with short stroke actuators 70A-70C and 76A-76C, respectively, is because the position of the pinion 19 is first fixed in a coarse manner with respect to the gear 42. The gear 42 is then moved slightly by moving the gear housing 46 to finely adjust the setting. This means that the actuators 70A-70C and 76A-76C have to move very little in order to accommodate the fine adjustments for gear setting and for accommodating the necessary changes that are done during a testing sequence. Thus, the struts will remain substantially straight and do not have to accommodate a significant angle that is offset from a direct line of action of the actuators. However, side loading of the gear carriage 46 could affect the operation of the actuators if this offset loading exceeds reasonable levels.

As stated, FIG. 7 illustrates an alternative arrangement of the horizontal plane actuators 76A-76C, which includes a bell crank loading arrangement 81 useful for reducing lateral space requirements. In this embodiment, the actuators 76A and 76B operate through loading struts 82A and 82B to shift the gear carriage 46 in direction along the axis 65 generally perpendicular to the axis 26 of the pinion 19, as well as providing for movement about the central axis 48, which is essentially ineffective due to rotation of the gear 42 about this axis. The actuator 76C, however, is fixed to the table 16 with its longitudinal axis parallel to the axes of actuators 76A and 76B. In this instance, the link 82C is coupled with a universal couple to the actuator rod 80C of the actuator 76C at one end, and is universally coupled to the bell crank assembly 81. The bell crank assembly 81 includes a pivot shaft 85 which, in turn, is supported by the table 16 on a lower surface thereof, and above the platform 53. Since the table 16 is broken away in FIG. 7, the shaft 85 for pivoting the bell crank 84 is shown in cross-section. A rigid strut 82D that can have load sensing capabilities connects the gear carriage 46 with the bell crank 81 at end 86. The strut 82D connects to gear carriage 46 as at 87, which is a common pivot point on the gear carriage 46 with strut 82B.

Operating the actuator 76C causes the bell crank 84 to pivot and apply a load along an axis that is generally parallel to axis 26 of pinion 19. Again, with limited movement, the angle change of the strut 82D with respect to axis 26 is not significant under testing.

With either of the above embodiments, the coarse settings are used to preset the system with nominal center settings as close as possible so that proper adjustments can be made. During the calibration procedure, the actuators move the gear carriage and thus gear within a small range of movement to align the pinion and gear precisely as well as move the position of the gear during the test. It is furthermore desirable to have a precise and repeatable device that can load and unload the gear from the gear spindle, which can require more displacement than used during the fine setting adjustments. In other words, it is necessary to move the gear spindle away from the pinion so the gear can be removed from the gear spindle without the pinion interfering. Once the new gear is put into place, the device can be repositioned at least in a coarse manner, so the operator does not have to recalibrate the entire system after loading a new part. This is true even if the part is exactly the same as the previous one. The overall travel of the loading system or device must be large enough to free the gear from the pinion, or vice versa, and leave space to remove it safely without damaging any of the teeth. It is apparent that the system described above can use the same three vertical actuators to load and unload the gear, as seen in FIG. 1. The advantage is a simple configuration, and one uses the same motion for the fine settings as well as for the loading and unloading. The disadvantage is that the overall stroke of the actuators becomes too long and the total system stiffness will suffer proportionally. The stiffness of any actuator is proportional to one over the length of the actuator (L), or $$\left(\frac{1}{L}\right).$$

Figure 8:
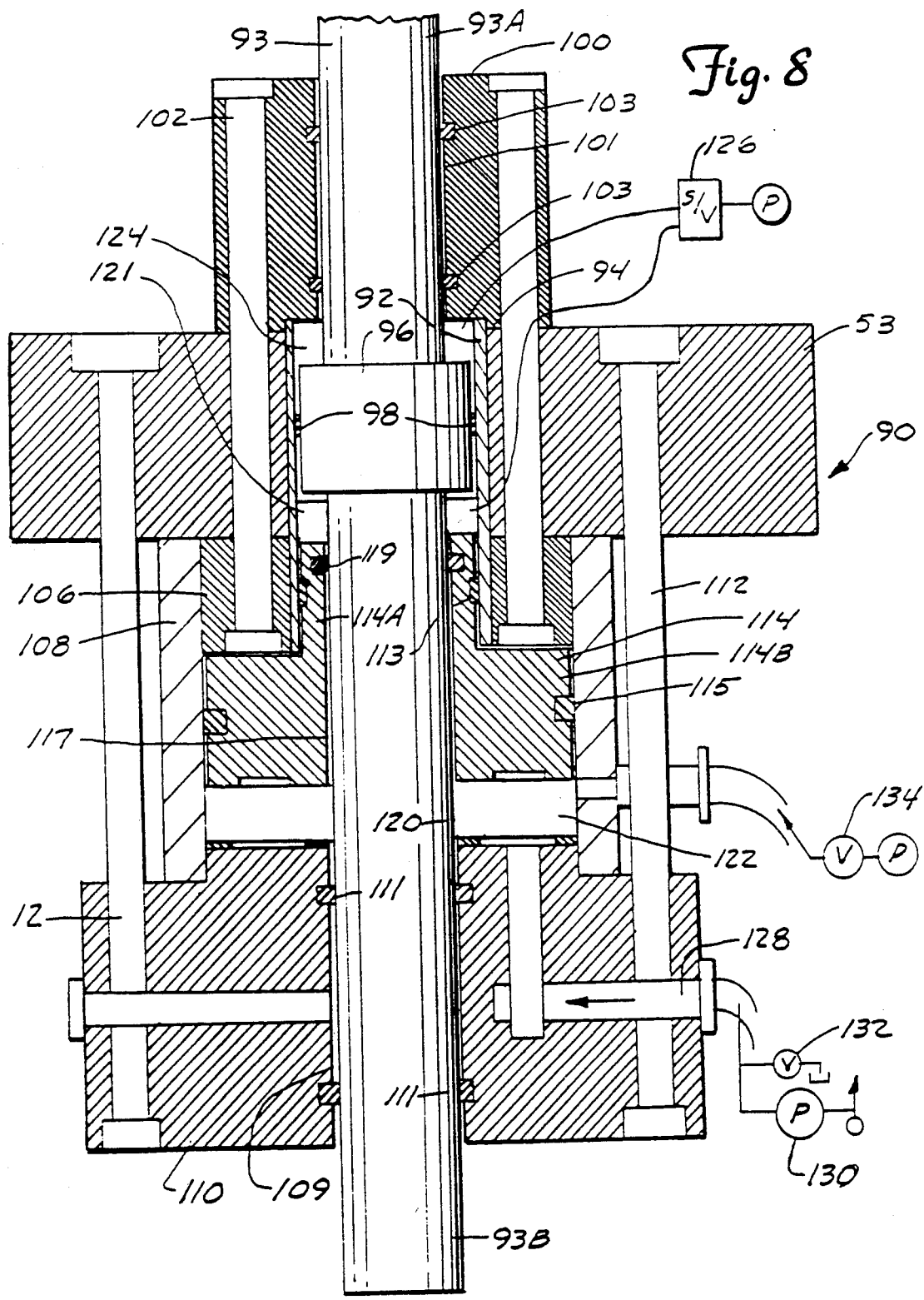
FIG. 8 is a sectional schematic view of a dual cylinder actuator utilized with the present invention.

FIG. 8 illustrates a two-stage actuator that permits relatively long strokes sufficient for loading and unloading the gear from the gear carriage and relatively short strokes sufficient for fine adjustment between the gear 42 and the pinion 19. The actuator, illustrated generally at 90, has a main support being a portion of the support table 10, for example, lower plate 53. The lower plate 53 has a central bore 92. A piston and rod assembly 93 is slidably mounted within the bore 92. A suitable seal 98 is annularly positioned around the piston 96 and slides against a precision machined inner sleeve 94 with movement of the piston and rod assembly 93. A piston rod guide housing 100 having a central bore 101 is fastened to the lower plate 53 with suitable bolts or connecting rods 102. Suitable seals 103 seal the upper rod portion indicated at 93A of rod assembly 93 for longitudinal movement of the rod 93 within the bore 101 in the guide 100. The connecting rods 102 also hold a rigid annular (ring-like) spacer 106 on an opposite side of the plate 53 from the guide 100. The ring 106 is press fit to sleeve 94 and within an outer cylindrical housing 108. The ring 106 centers the housing 108 relative to the sleeve 94.

The outer cylindrical housing 108 is positioned against the bottom side of the lower plate 53 and surrounds the spacer ring 106 and also is abutted by a lower piston rod guide housing 110 opposite from the guide housing 100. The guide housing 110 has a bore 109 that slidably receives a rod portion 93B of rod assembly 93 and guides this portion of the piston rod. Suitable seals 111 seal the lower portion 93B for longitudinal movement of the rod 93 within the bore 109.

The guide housing 110 is held in place relative to the lower plate 53 with suitable fasteners 112, which compress against the lower end of the cylinder 108. The cylinder 108 houses a second piston 114 that has a neck 114A that fits inside the sleeve 94 with a main body portion 114B that fits inside the cylinder 108. The main body portion 114B is suitably sealed with respect to the cylinder 108 with a seal 113, while the neck portion 114A is sealed relative to the sleeve 94 with a seal 115.

The piston 114 includes a bore 117 through which the piston rod portion 93B is positioned within. A seal 119 allows relative longitudinal sliding movement between the rod portion 93B and piston 114, while isolating pressure chambers 121 and 122 above and below the piston 114, respectively.

The chamber 121 is bound by the upper portion of neck 114A, the lower portion of piston 96 and the inner sleeve 94. The chamber 121 is filled with a substantially incompressible fluid through which when sufficiently pressurized and the piston 114 held stationary, and thereby acting as a lower end cap, moves the piston 96 and connected rod portions 93A and 93B upwardly. A third pressure chamber 124 bound by the upper portions of piston 96, the guide 100 and inner sleeve 94 is disposed on an opposite side of the piston 96. The chamber 124 drives the assembly 93 downwardly when pressurized. A suitable servovalve 126 connected to chambers 121 and 124 through pressure lines and ports, not shown, selectively controls the positioning of piston 96.

The chamber 122 below the bottom side of piston 114 and further defined by cylinder 108 and lower guide housing 110 is filled with a substantially incompressible fluid through which when sufficient pressure is applied moves the piston 114 up to the position shown, holding it tightly against the spacer ring 106. In this position, the stiffness of the actuator 90 is defined by the fluid in the chambers 121 and 124 on opposite sides of the piston 96 as long as the pressure forces on chambers 121 and 124 do not exceed the pressure forces in chamber 122. Selective pressurization of the chambers 121 and 124 provides a short stroke actuator having sufficient stiffness to adjust the position of the gear 42 with respect to the pinion 19 during testing. A longer stroke for loading and unloading of the gear 42 from the tester is provided with movement of the piston 114. A manual pump indicated at 130, and a manual relief valve 132 that will permit the operator to have a "feel" for movement of the piston 114 to its stopped or retracted positions. In its retracted position, the piston 114 will rest against shock absorbing members 120 placed within the chamber 122.

For a high pressure actuation of the actuator 90, after the manual positioning of the piston 114 against the spacer 106 has been achieved, a suitable valve 134 that leads from a higher pressure source can be used to increase the pressure in the chamber 122. The increased pressure in chamber 122 forces the piston 114 tightly against the spacer 116 so that selective pressurization of chambers 121 and 124 controls movement of the piston 96. During the short stroke operation of the actuator 93, utilizing the servovalve 126 and the chambers 121 and 124 acting on piston 96, a very high stiffness is achieved. However, when loading and unloading of the gear 42 is desired, a substantially longer stroke of the rod 93 is possible through selective pressurization of the chamber 122 with subsequent movement of the piston 114.

Figure 9:
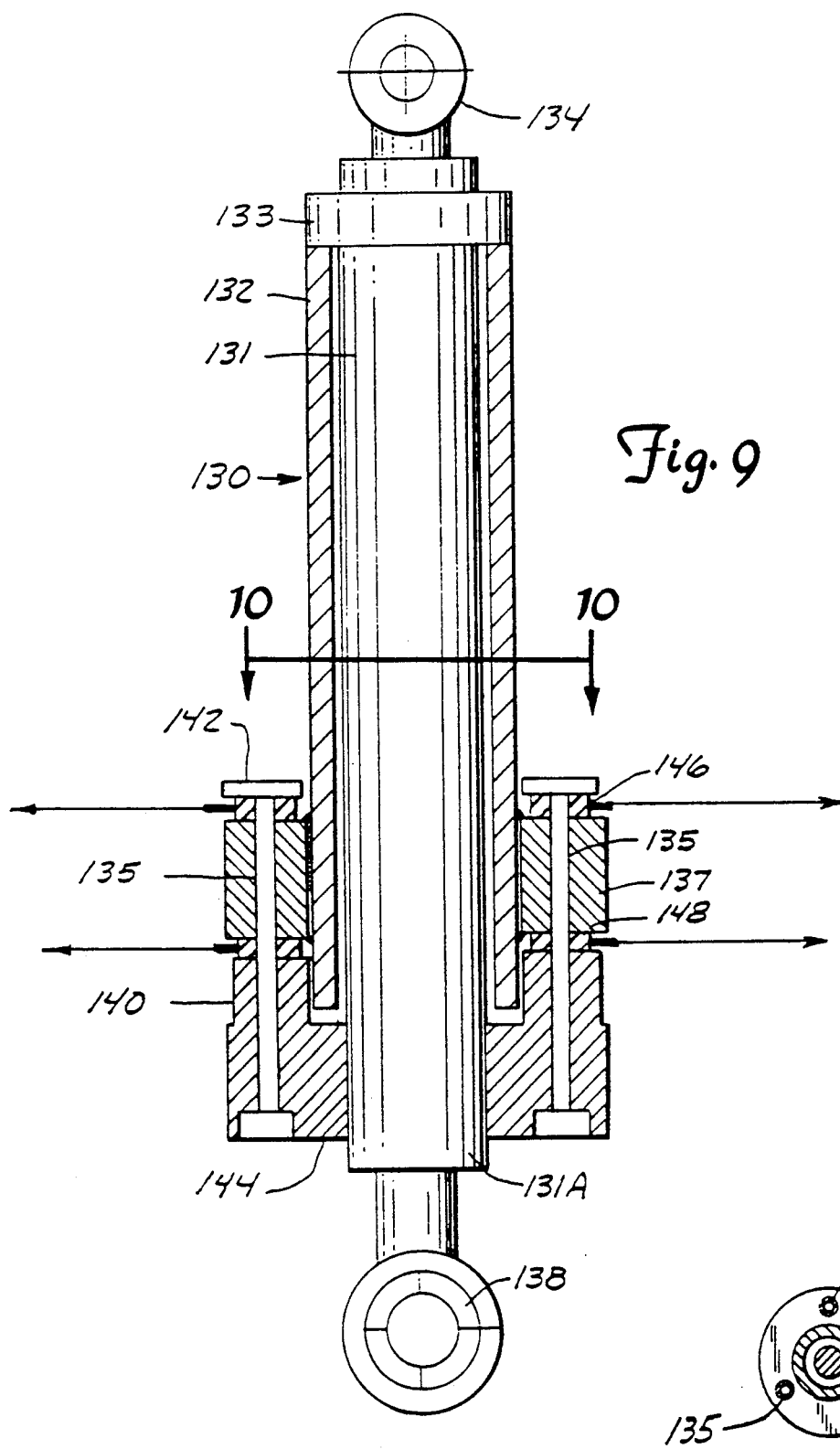
FIG. 9 is a sectional view of a typical strut such as those shown in FIG. 3.
Figure 10:
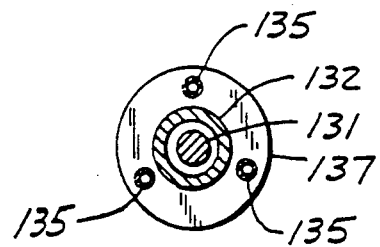
FIG. 10 is a top sectional view of the strut of FIG. 9 illustrating placement of load sensors.

FIGS. 9 and 10 illustrate a typical strut which can be used for the struts 82A–82D shown in FIG. 7 of the alternative embodiment of the invention. The strut shown generally at 130 includes a rigid or stiff inner rod 131 that is supported in a tubular outer housing 132, which has an end cap 133 welded thereto. The inner rod 131 has a suitable connecter 134 that can be a spherical seat rod end or the like. The housing or tube 132 further includes an annular ring 137 welded thereto at an opposite end from the cap 133, which forms an annular flange. The flange 137 has at least three bores 135 equally spaced therearound as shown in FIG. 10.

The opposite end of the rod 131 has a connector end 138 secured thereon. A ring 140 is welded to the rod 131 and faces the flange 137. As shown in FIG. 9, three tension carrying bolts or cap screws 142 are passed through the bores in the flange 137 and in the ring 140.

Load sensors, such as piezo-resistive washers indicated at 146 are positioned beneath the heads of the cap screws 142, and against the upper surface of the flange 137. Similar load sensitive sensors 148 are positioned between the upper side of the ring 140 and the lower side of flange 137. When compression loads are applied between ends 134 and 138, load washers 148 between the ring 140 and the bottom of the flange 137 will be subjected to these compressive loads and provide a proportional signal representative thereof. In contrast, under tension loads between the ends 134 and 138, the fastener members 142 will transmit the tension loading to the heads of the connectors 142 which will act to compress the load washers 146 and provide a signal indicating the amount of tension on the strut 130. By using a minimum of three load sensors 146 when the strut is under tension loading, or three load sensors 148 when the strut is under compressive loading, with each load sensor equally spaced around the rod 131 as illustrated in FIG. 10, overturning moments about axes perpendicular to the longitudinal axis of rod 131 can also be determined. The strut 130 operates as a load cell to provide an indication of force applied to the gear carriage 46 through each corresponding actuator. Also, conventional LVDT's, for example, at 137A, 137B and 137C in FIG. 1 and 139A, 139B and 139C in FIG. 2, can be used with each actuator to determine the position of the gear carriage 46.

Feedback signals from sensors 137A–137C and 139A–139C, encoder 35 and encoder 40 are provided to a computer control system to be explained below. The computer control system uses these signals to place loads on the gears through brake assembly 37 or adjusts the speed of the gears through motor 34, as well as adjusts the position of the gear 42 relative to the fixed pinion 19 using the actuators.

A network to the computer controller can be applied. The optical encoders 35 and 40 measure the transmission errors and accelerometers can be utilized to measure vibration. Microphones can be used to analyze the acoustic noise and different positions of the gear 42 relative to the pinion 19 can be tried with different results being recorded. In this manner, gear sets can be provided with specific mounting positions for minimizing noise, and comparative tests also can be run to determine if one gear cutting machine, for example is providing noisier or more vibration plague to gear sets than others. The gear spindle 44 is always held perpendicular to the gear carriage plane, and is moved in a dynamic manner in response to a program of remote parameters, for example so that tooth pattern, noise, vibration and other factors can be evaluated. Further, gear box deflections can be evaluated and simulated by movement of the aforementioned actuators. Of course, suitable standards can be applied so that the results can be compared.

SET UP AND CALIBRATION

Figure 11:
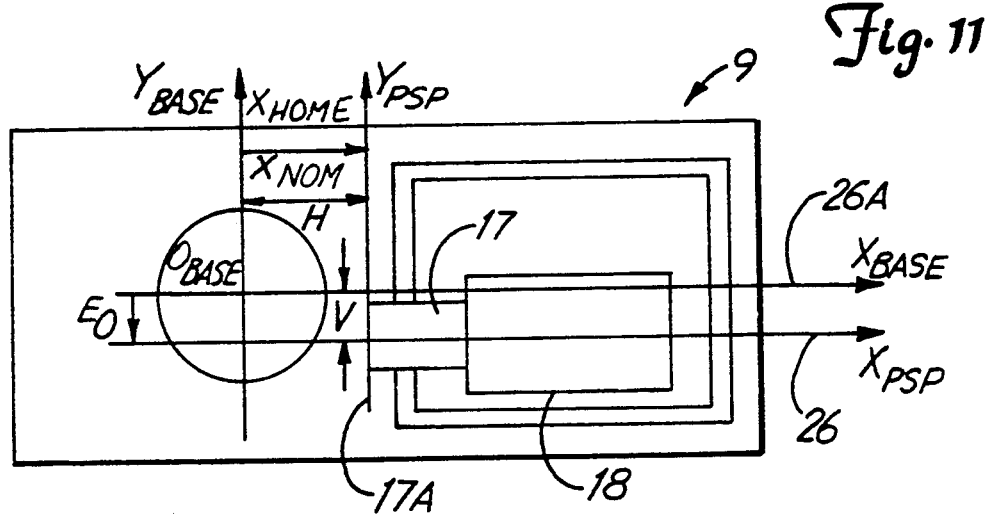
FIG. 11 is a top schematic view of the gear tester of the present invention illustrating a hypoid offset.
Figure 12:
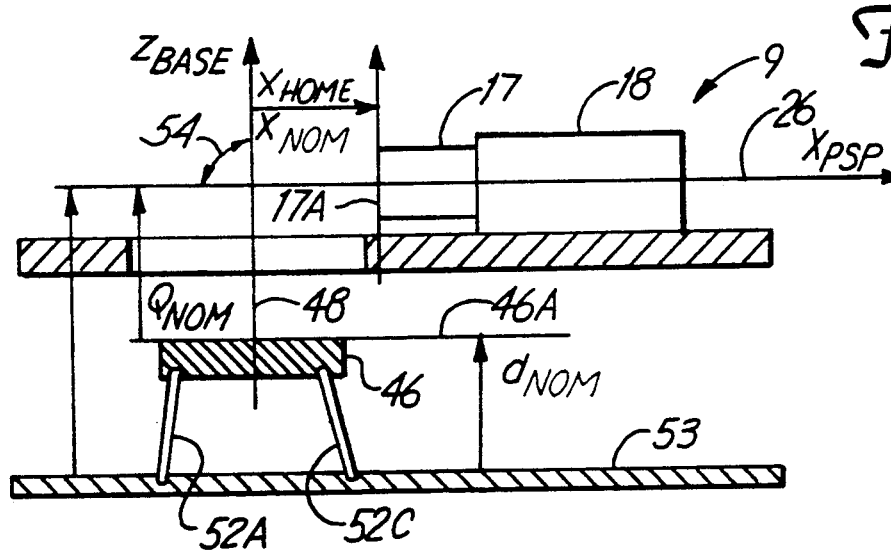
FIG. 12 is a side schematic view of the gear tester illustrated in FIG. 11.

When the gear testing system such as that shown in the present disclosure is initially set up, the procedure has to be considered as a two step operation. First, there are coarse settings which would establish relative orientation of the pinion axis versus the gear axis. As schematically shown in FIGS. 11 and 12, these distances include, the distance of hypoid offset, V (also labelled $E_o$); the H position which is the pinion mounting distance measured from the support face or surface of the pinion to the plane through the axis of the gear and perpendicular to the pinion axis; the gear mounting distance 51 commonly called Q, which is the distance from the pinion axis to the plane of the mounting of the gear, and the shaft angle 54, which is generally considered to be 90 degrees. The remaining two degrees of freedom, namely rotation about the axis of the pinion, and the rotation about the gear axis are not as important because both the gear and the pinion have sets of bearings in support about their respective axes.

The coarse settings, which can be achieved in a number of ways, are used to preset the desired initial mounting conditions between the pinion and the gear. In many machines, these settings are the only way to define the relative position between tested members, so they must be preset with maximum accuracy of the system. As a result, high accuracy and resolution are desired from the set up procedure. Utilizing the present arrangement, the set up procedure can be described in two steps.

First, in coarse settings, as shown, the one member that is moved relative to the other is the pinion that is movable along its rotational axis and laterally thereto, to obtain the H and the V dimensions, respectively. These dimensions are given by the gear maker and are essentially the same for an entire run of gears. For example, testing can be achieved with a single run of gears which may go on for one month, so the coarse settings would remain set for that length of time for the family of gears that are being tested. The coarse setting comprise moving the stationary pinion spindle relative to the frame. Set up bars or blocks that are of known size are used to verify where the axes of the gears and the pinion are located. This can be achieved within about 0.010 inches. The fine setting of the pinion can be achieved by using interferometer techniques which give very accurate determinations of axis position and straightness, and can be used for arranging the center of the pinion axis relative to the center of the gear axis. Hubs, which will be described below, utilizing interferometers can be placed on the gear support for aligning the pinion axis. Then fine settings can be achieved by moving the gear carriage utilizing the actuators in the necessary degrees of freedom and considering the pinion as the stationary member. Resolutions of plus or minus 0.025 inches are adequate, and the fine settings utilizing the actuators then can be carried out.

Figure 13:
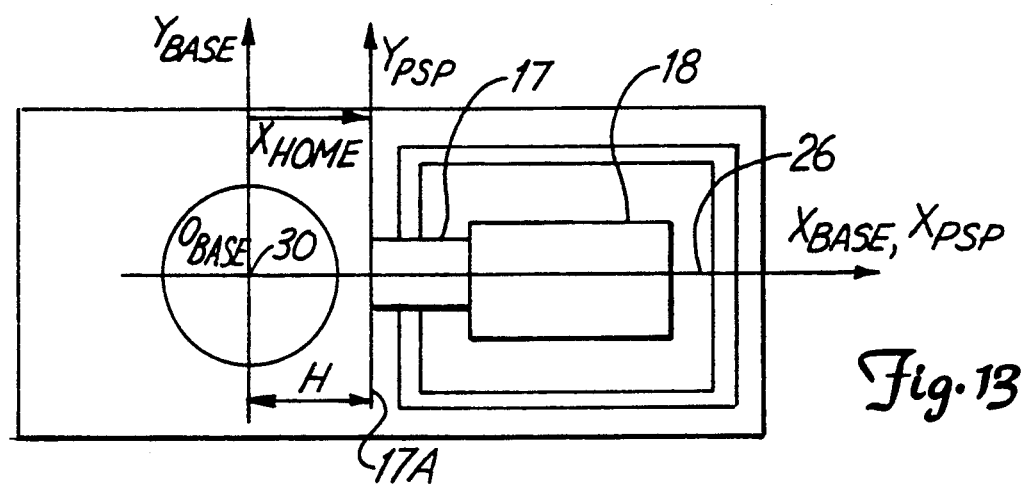
FIG. 13 is a top schematic view of the gear tester of the present invention having no hypoid offset.

The schematic representations of the arrangement of a gear support member of a pinion housing are shown in FIGS. 11-14. FIGS. 11 shows a hypoid offset, while FIG. 13 illustrates a pinion position without a hypoid offset. The gear carriage 46 is represented schematically and is mounted on suitable actuators for convenience shown at 52A and 52C. The pinion housing 18 is also illustrated schematically and is used for mounting the pinion spindle which has an axis shown at 26 in both FIG. 11 and 12, and also represented in FIG. 13 and 14. The labeling in FIGS. 11-14 is $X_{psp}$ for pinion spindle axis. The $X_{base}$ line is parallel to the pinion spindle axis 26 and passes through the axis of the gear, which is $Z_{base}$ and indicated also at 48. The $X_{base}$ line is indicated at 26A.

Figure 14:
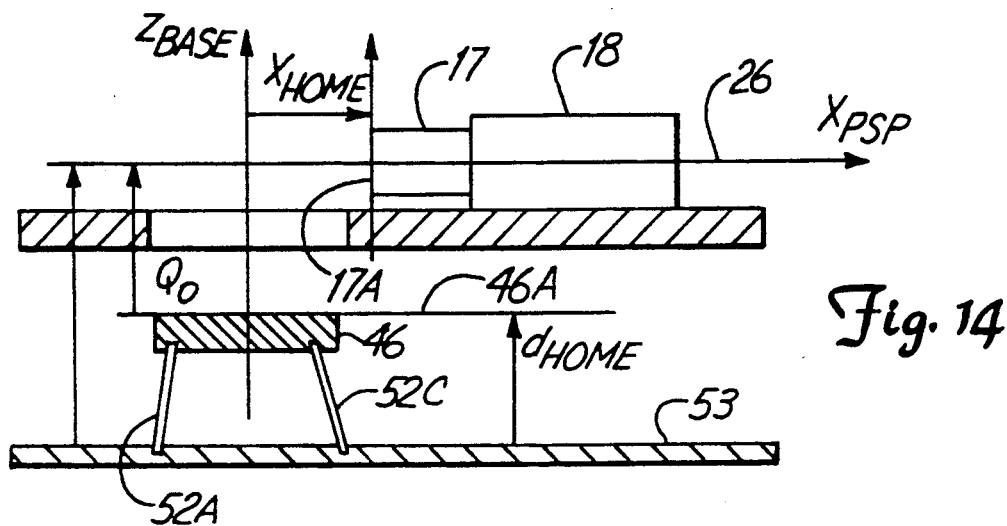
FIG. 14 is a side schematic view of the gear tester of FIG. 13.

The H distance is measured from the support surface for the pinion indicated at 17A to the axis 48 of the gear. The Q dimension is measured from the support plane 46A of the gear housing to the axis of the pinion 26, as shown in FIGS. 12 and 14. FIGS. 11, 12, 13 and 14 are oriented in connection with FIGS. 15, 16 and 17, which are vector diagrams to show how calibration and set up can be used as a start-up procedure for a new set of gears, after a powerdown event, or after a possible displacement/disturbance under a load or external deflections, which disrupts or changes the setting.

Figure 18:
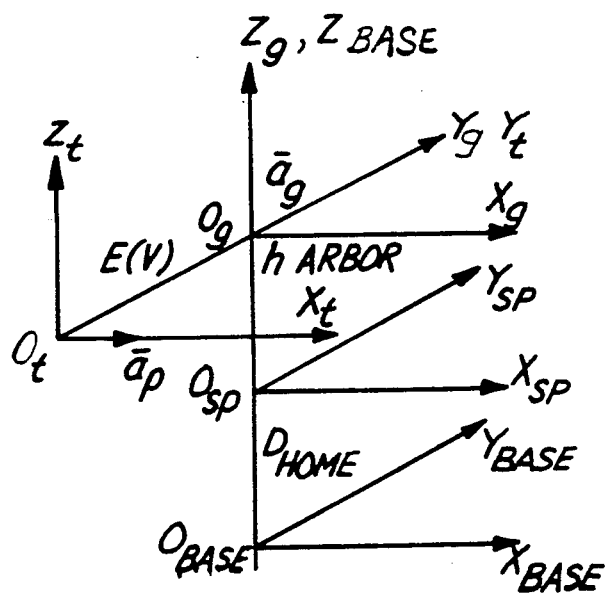
Figure 19:
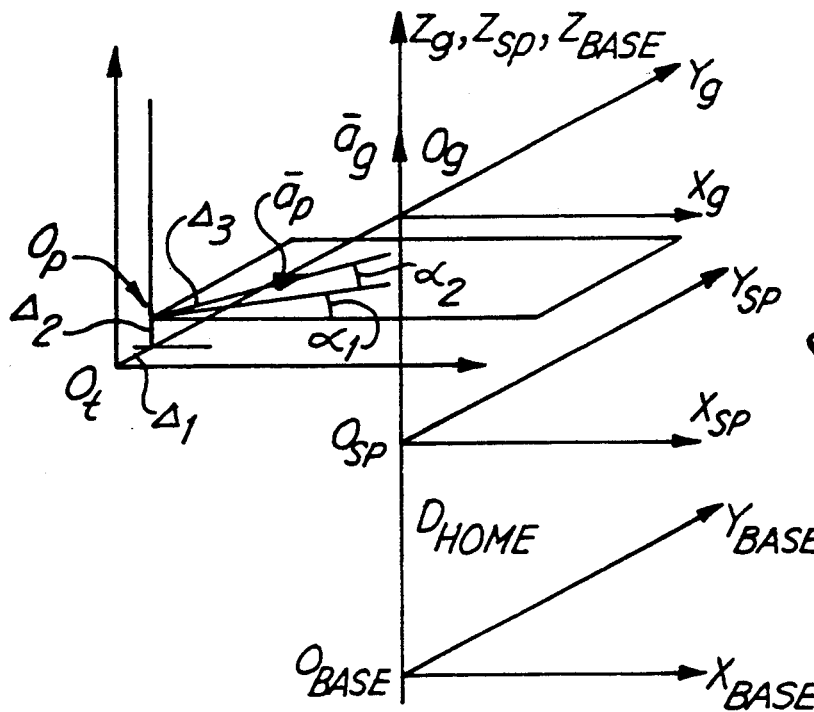
Figure 20:
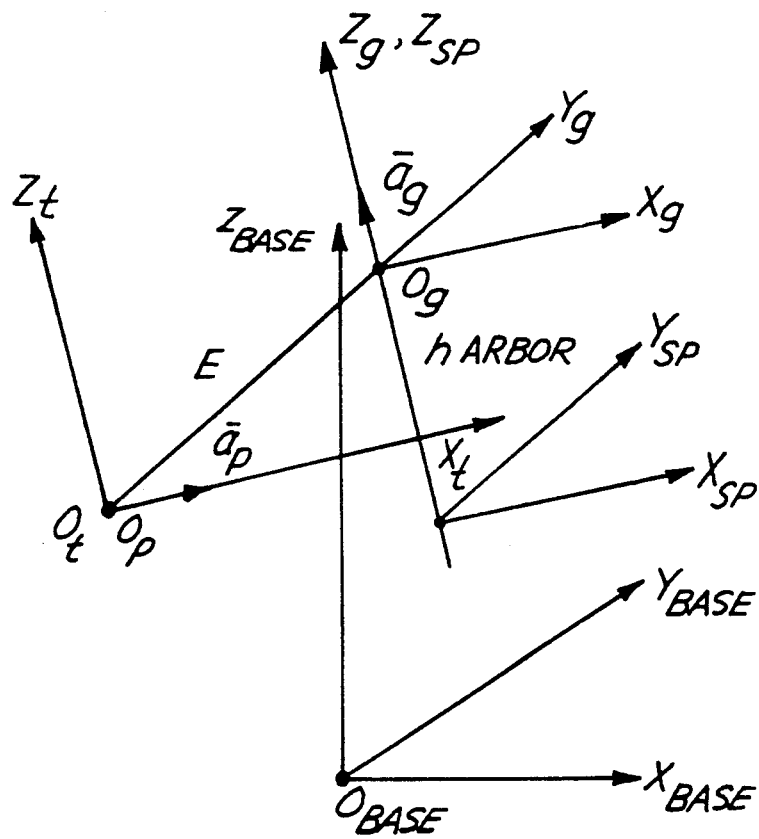

The following reference procedure is to restore the proper relative orientation between the pinion spindle and the gear spindle. The pinion spindle 17 lies along the central axis 26 for rotation. The gear spindle 44 having axis 48 extends along the Z axis. A coordinate X, Y, Z system is shown in FIGS. 18, 19 and 20.

There are a number of significant positions for the pinion and the gear that must be established through a selected calibration procedure. They are the gear spindle "home" position; the pinion spindle "home" position; an adjusted gear spindle position called the gear reference position, which is different from the gear spindle home position, and is the gear position defined as a function of (or based upon) the location and orientation of the pinion spindle at its home position; a nominal position for the pinion and the gear, which is the first "settings" dependent position; and a gear working procedure which differs from the gear nominal position by the fact that any of the four degrees of freedom parameters V, H, Q and S can be changed so that they do not equal a nominal setting.

In summary, the different gear and pinion spindle positions identified above are:

gear spindle "home" position
  Defined based on actuator stroke of each actuator, wherein each actuator is positioned at midstroke. The position provides a reference distance from the lower plate 53 to the gear spindle face surface 46A ($d_{Home}$ in FIG. 14). This position does not guarantee the squareness of the gear spindle with respect to the pinion spindle.
  Must be set after any major maintenance procedure of the gear tester.

pinion spindle "home" position
  Defined based on a set of gaging bars supplied with the tester for a hypoid offset equal to zero. The position provides reference distances with respect to the tester frame based on a selected distance from the gear axis ($X_{Home}$ in FIGS. 13 and 14). This position does not guarantee the squareness of the gear spindle with respect to the pinion spindle.

Must be set after any major maintenance procedure of the gear tester and before the gear reference position is obtained.

gear reference position

New gear spindle position (different from the gear home position) established based on the squaring the gear spindle to the pinion spindle with the pinion spindle at its home position. This position is obtained by controlling the actuators with the fine settings to move the gear spindle.

Must be set after any major maintenance procedure and after the gear and pinion home positions have been established.

pinion nominal position

New pinion spindle position to allow a selected gear set to run. This position is obtained by positioning through the coarse setting the pinion spindle to provide any necessary nominal H and V settings. The pinion spindle is then fixed to the table 16.

Must be set for any new gear set.

gear nominal position

New gear spindle position to allow a selected gear set to run. This position is obtained by mounting a fixed gear arbor to the gear spindle and then positioning through the fine settings the gear spindle to obtain a nominal gear mounting distance for the gear to be tested.

Must be set for any new gear set.

gear working procedure

New position for gear spindle only during testing. The pinion spindle position is held stationary (except in rotation). As the pinion rotates during the testing procedure, the gear spindle is moved by the actuators under servocontrol through the fine settings relative to the nominal gear position to simulate the desired mounting conditions between both members.

The gear spindle home position is further defined as a state of the actuator system when all of the actuators utilized are at a middle stroke or a reference "zero" position. This can be established by commanding a zero signal for all closed loop controllers in the actuator, to bring the actuators back to a position where the position feedback signals provided, as will be further explained, are at zero. In this position, the pinion spindle is suspended above the base plate indicated in FIGS. 11 and 13 at 53, at a given, set distance called $D_{home}$. This is shown in FIGS. 18 and 19 as well, and goes from the origin $O_{base}$ in FIGS. 18 and 19 to the level of the pinion spindle axis 26. As shown, the gear spindle axis is in a plane defined by the $X_{SP}$ and $Y_{SP}$ axes. The angular position of the gear spindle relative to the base 53 or some reference horizontal plane, may not be ideal because of some manufacturing errors, in that the mounting surface 46A of the gear may be tilted, which would skew the gear spindle.

During the process of assembling the test device, one has to adjust all of the components so the gear spindle 44 would be as close as possible to a "square" condition at the gear home position. Again, all actuators are at a middle stroke position; the gear spindle axis 48 is positioned normal to the base 53, the vertical axis $Z_{base}$ passes through the middle of the gear spindle (co-axial with the spindle axis); and the distance from the base 53 to the spindle backing plane surface 46A on the mounting plate of the carriage, is $d_{home}$ (FIG. 14). There will be some errors and pre-existing conditions at the gear home position, but these are minimized.

The pinion spindle home position is the position of the pinion spindle when the pinion spindle housing 18 is at a zero position, which is predefined and identified by the design of that particular machine. The hypoid offset is set to zero, as shown in FIG. 13. The shaft angle is set to 90 degrees. $Q_O$ is a machine constant and a part of the machine's general specifications. Note Q is the distance 51 from the plane 50 for the support of the gear and the spindle axis measured along the Z axis (FIG. 6).

The actuators 52A, 52B and 52C are moved to bring the gear spindle to a gear reference position. The reference position is different from the gear home position in that the home position of each of the gear and pinion spindles is independent, and is determined by exterior settings, while the gear reference position is a gear position that is based on or referenced to location and orientation of the pinion spindle in its home position.

When the gear and pinion are at "home" positions, there may be still an error in orientation location of one of the gear spindle relative to the pinion spindle due to manufacturing and assembly errors. To compensate for these small misalignments, the gear spindle can be moved to the gear reference position using the fine setting procedures with the actuators, particularly using the sets of actuators previously described. The fine settings ensure that the settings indicated by the feedback sensors or position sensors of the actuators or any other alignment devices being used, indicate that the gear spindle is properly positioned relative to the pinion.

The nominal position again is the first "setting" dependent position since in the nominal position the gear spindle and pinion spindle must be oriented in such a way that the gear and pinions are at their nominal relative position to mesh with each other. That is, proper H, V, Q, and S settings are provided. To achieve the nominal position for both spindles, one goes through the coarse and fine setting adjustment procedures that have been described briefly, and will be more fully described below. The nominal position is somewhat similar to the reference position, except the nominal hypoid offset and correct mounting distances for both members are provided in the nominal position.

The working procedure is different from the nominal position by the fact that any of the four degrees of freedom parameters, V, H, Q and S, can be changed during testing.

FINE SETTINGS

As mentioned above, the coarse settings in a major start-up procedure are achieved by fixing the pinion spindle position relative to the table 16 by clamping it in place at a position measured by gauge blocks or other techniques, while the gear spindle coarse setting is made by specifying the size of the gear arbor to be used. The pinion spindle and gear spindle positions are the nominal settings that are given by the gear manufacturer when the set of gears are made. That is to say that the test settings are close enough to the desired positions of the pinion and gear spindle to permit the gears to run. Since the accuracy of these settings is not very high, further adjustment is required to improve the relative position of the gears. This is done by the fine settings movement. The operator has to establish the amount of movement to be produced by the fine setting mechanism and thus has to determine the deviation of the setting after the coarse adjustment. The gear positions have to be measured and compared with the desired position.

Kinematically this is done by using a set of coordinate systems with every degree of freedom which is to be used during testing represented. The main coordinate system $S_{base}$, as shown in FIG. 18, is rigidly connected to the frame base 53 and is a stationary coordinate system relative to the frame. If the proper initial alignment is carried out, the Z axis of that coordinate system is co-axial with the gear spindle 44, that is the Z axis lies along the axis 48, which is represented also as the Z axis of the spindle, $Z_{SP}$. The origin of the gear spindle coordinate system (called $S_{SP}$) is rigidly connected with the pinion spindle axis at $O_{SP}$ and which can be identified as an intersection of the plane of the back support for the pinion spindle and the axis of the pinion spindle. Then, the distance from the base plane $X_{base}$, $O_{base}$, $Y_{base}$ to that origin $O_{SP}$ at home position is $D_{home}$.

The gear spindle axis $Z_{SP}$ can be used for establishing the mounting surface which will hold the back of the gear member at $O_G$. This surface is a plane labeled 46A in FIGS. 11 and 13 and is based upon a proper ARBOR dimension $H_{ARBOR}$, which is essentially a spacing dimension.

If the coarse settings would provide the ideal positioning for both spindles, the orientation of the pinion spindle axis 26 which lies on $X_t$ to be defined by vector the $\bar{a}_p$, and the gear spindle axis 48 which lies along $Z_g$ and defined by vector $\bar{a}_{gs}$, then the orientation would be as shown in FIG. 18. E is the hypoid offset and $\bar{a}_p$ and $\bar{a}_g$ have a 90 degree shaft angle. Origin points $O_g$ and $O_p$ are so called "crossing points" when establishing a matrix or running an algorithm controlling the actuators.

However, the coarse settings generally do not provide an accurate enough position for testing the gears, and that leads to the necessities of the fine settings which compensate for the inaccuracy of the coarse settings. In order to know how much one has to move the gear in order to achieve the accurate settings, it also is necessary then to determine the present position from which to start.

The true current position of the gear spindle relative to the pinion spindle is depicted by FIG. 19. Here the gear spindle $\bar{a}_g$ is shown at the home position and the pinion spindle $\bar{a}_p$ has been disturbed after the coarse setting procedure. Thus, the vector $X_T$ shown in FIG. 18 which represents the true pinion spindle position does not correspond to the spindle axis orientation $\bar{a}_p$. The crossing point $O_P$ is also offset from $O_T$, which is the true crossing point when the true hypoid offset distance is achieved. There are five error parameters, $\Delta 1$, $\Delta 2$, $\Delta 3$, which represent linear distance errors, and $\alpha_1$ and $\alpha_2$ which represent angle errors. These parameters establish the current gear spindle position in the base coordinate system $S_{base}$.

After the errors have been measured, which can be done with existing interferometers or other devices as will be shown, the pinion spindle position cannot be directly corrected since the pinion spindle is fixed to the frame and the coarse settings procedure have been performed. That means that one has to move the gear spindle carriage 46 and the gear spindle 44 to correct those errors. The corrections are shown in FIG. 20, and are fine settings that are achieved by operating the actuators 52A, 52B and 52C under servo control, as well as the horizontal actuators 56A–56C.

If one compares the true position vector system shown in FIG. 18 with the corrected vector system shown in FIG. 20, it can be seen that on both representations the relative spindle positions for the gear and the pinion are the same, but they will be shifted relative to the base coordinate system, $S_{base}$ (FIG. 18). To "square" the orientation of the gear spindle and the pinion spindle, there are two options. The first is to measure the errors that are depicted in FIG. 19, and then move the gear spindle based on the proper coordinate transformations which can be derived analytically, utilizing the remote feedback sensors such as LVDT's on the actuators. The second approach is to put a special calibration device on the system to be calibrated with a set of sensors and use the calibration device for feedback signals to provide the proper corrections by moving the gear spindle and reading the current errors directly from the calibration device. The second solution is more readily placed into practice, since one does not have to rely on the accuracy of calculations. Whereas, when one would calculates or measures the error, it is required that the final position be still verified in some manner.

Figure 21:
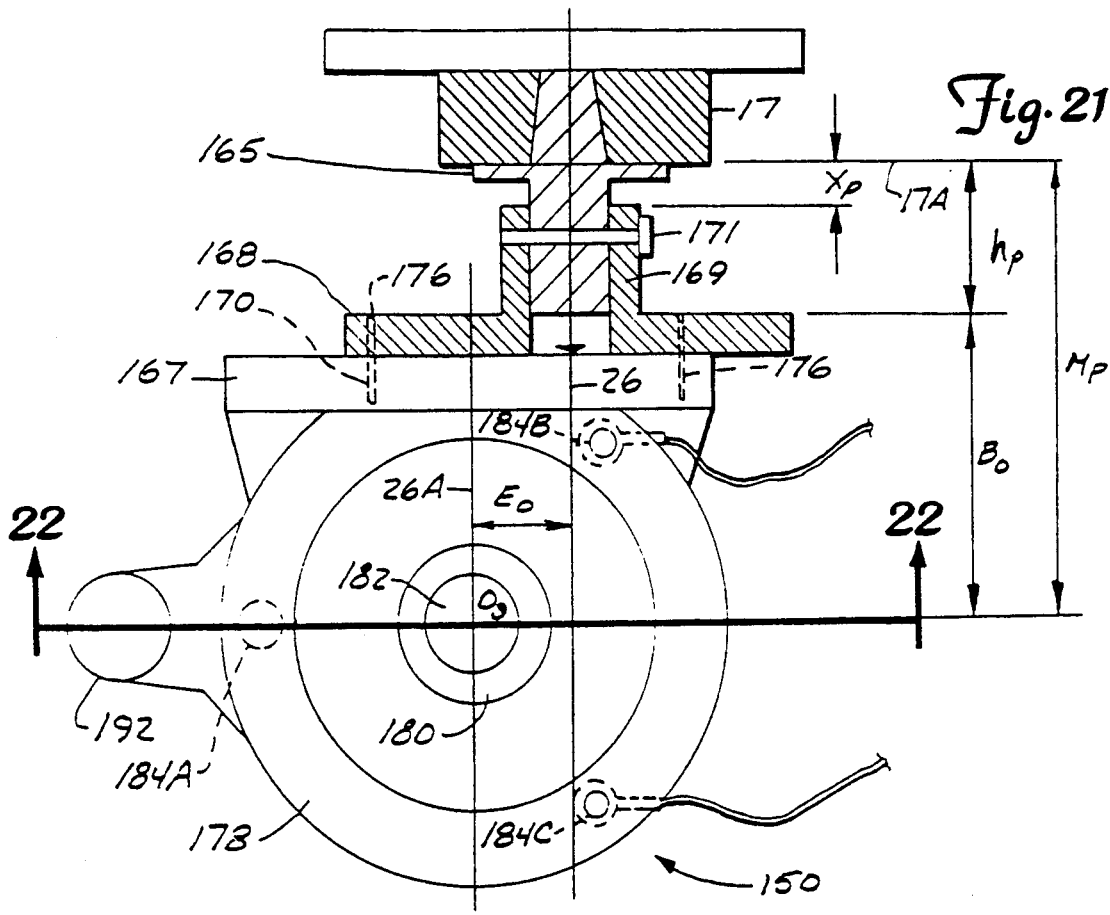
FIG. 21 is a top sectional view of a calibration device used to align the pinion relative to the gear.
Figure 22:
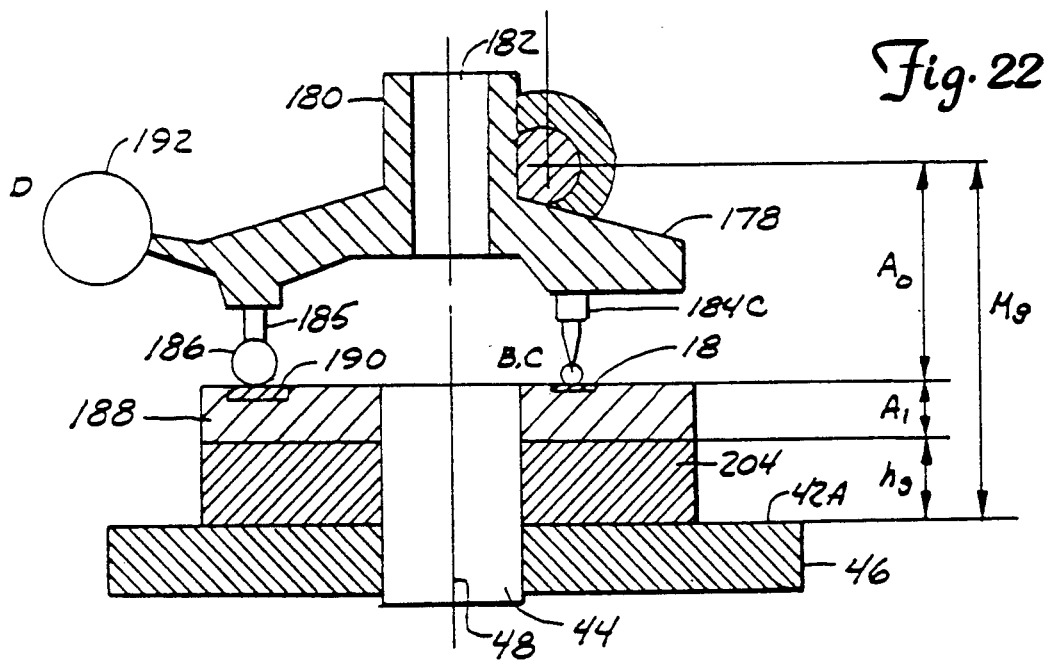
FIG. 22 is a sectional view of the calibration device taken on line 22—22 in FIG. 21.

Referring to FIGS. 21 and 22, the fine adjustment of the gear 42 relative to the pinion 19 can be achieved through a calibration device 150, which mounts so that it can be co-axial with the axis 26 of the pinion spindle 17 and the axis 48 of the gear spindle 44. The calibration device 150 is seated against the gear locating faces of each of the gear spindle seating plane and the pinion spindle seating plane. In FIG. 21, the rotating pinion spindle 17 mounts a spindle adapter 165 that is seated in a precisely machined cone surface at the end of the spindle 17. Suitable locating means such as dowels and cap screws align the spindle adapter 165 with the spindle 17. The spindle adapter 165 is attached to a calibration or alignment body 167 through a support flange 168. The support flange 168 is mounted on the spindle adapter 165 with a hub portion 169 using a suitable drive pin 171. The hub portion 169 is capable of being adjusted along the shaft portion of the spindle adapter 165, and held in place with the drive pin 171 or with a suitable set screw. The spindle mounting surface 17A provides a reference surface, and the distance $X_P$ shown in FIG. 21, which extends from the mounting surface 17A to the back of the hub 169 must be preset so that the distance $M_P$, which is shown in FIG. 21, and which is the same dimension as $X_{home}$ shown in FIGS. 11–14 is also set.

A main mounting body 167 is joined to the hub 168 by slides or quideways that allow for movement, laterally of the pinion axis 26. In the preferred method of alignment, the support flange 168 and the main mounting body 167 are positioned on a bench so that the axis 26 is offset from the axis 26A to equal the nominal hypoid offset $E_O$. $E_O$ is the second predefined setting, and this setting as well as the setting $X_P$ must be verified on a bench or with a highly accurate coordinate measuring machine so that there is high accuracy of these two dimensions prior to use of the calibration device 150. When the desired hypoid offset $E_O$ is obtained, the fasteners 176 are used for clamping the main body 167 and the support flange 168 tightly together.

The main body 167 is a stiff frame that has an outer flange 178 and a cylindrical hub 180 with a central bore 182. The flange 178 has three support bores therethrough, indicated at 184A, 184B and 184C. The bores 184A–184C are positioned on a common radius from the center axis of the bore 182, and are spaced approximately 120 degrees apart. The bore 184A is used for supporting a shank 185 of a stylus 186. The shank 185 and the stylus 186 together comprise a standoff that is used to define the position of the main body 167 in the degree of freedom comprising rotation about the axis 26 of the pinion spindle 17. The pinion spindle 17 of course is free to rotate about axis 26. However, this free rotation is stopped when the stylus 186 is supported by the contact surface of a spacer 88. A bearing surface 190 is provided at the stylus location on the spacer 188 to avoid wear. A handle 192 is provided on one side of the main body 167 for manual lifting and lowering of the main body 167. The spacer 188 is supported on an arbor 204 that in turn is supported on the support surface 42A of the gear carriage 46. The gear spindle 44 is centered in bores in the arbor 204, as well as in the carriage 46. The dimension $H_g$ shown in FIG. 22 is the arbor height above the mounting surface 46A. The dimension $A_1$ represents the spacer 188 thickness, while $A_O$ represents the distance from the spindle axis 26 to the upper surface of the spacer 188. Together, the three distances $H_g$, $A_i$ and $A_O$ equal the gear mounting distance indicated as $M_G$ in FIG. 22. The arbor 204 has a different height $H_G$ for each different gear set and can be replaced as desired.

Prior to the time that the calibration device 150 is placed onto the spindle arbor 204 and spacer 188, LVDT or distance sensors in the bores 184B and 184C are placed on the main body 167. The bench set up procedure includes placing the stylus 186 at an adjusted location such that the axis of the center bore 182, which is shown coinciding with the spindle axis 48 in FIG. 14, is perpendicular or normal to the mounting surface 42A. The distance sensors 184B and 184C, which do not support any weight since the main body 167 is mounted to the support flange 168, are zeroed at this position, so that the orientation of the axis of the bore 182 is in a preselected position. When the stylus 186 is then placed onto the spacer 188, the readings from the distance sensors 184B and 184C will provide a simple indication of any difference from zero. Representative signals from distance sensors 184B and 184C are used for controlling the actuators supporting the gear carriage 46 to move the gear carriage 46 and thus the gear spindle 44, as well as the axis of the bore 182 to obtain a zero reading from the distance sensors 184B and 184C. Upon rezeroing, the pinion spindle 17 and axis 26 are then parallel to the planar mounting surface 46A of the gear carriage 46 and normal to the gear spindle 44 so that there is a shaft angle of 90 degrees. Desired shaft angles can be obtained during a test procedure, but the initial setting for the shaft angle is at 90 degrees. The accuracy of the step of self-calibration of establishing the mounting surface 46A of the gear carriage 46 parallel to the pinion axis 26 is determined by the accuracy of the sensing devices 184B and 184C. Using an LVDT-type sensor with a full scale of about plus or minus 0.1 inches, accuracy in the range of less than one micron can be obtained.

To align the gear spindle axis 48 indicated as $O_G$ in FIG. 21, relative to the center of the bore 182, which then leads to the proper hypoid offset $E_O$ (or V) and pinion mounting distance $M_P$, the gear spindle 44 in the bores for the arbor 204 and space 188 is moved in a parallel plane until a center of bore 182 is co-axial with the center of the gear spindle 44. This can be achieved in different manners; however, one approach is to use X-Y detectors or position sensing photodetectors, sometimes called PSD Sensors. PSD sensors are available from several companies, such as United Detector Technology of Hawthorne, Calif., EG & G Judson of Montgomeryville, Pa., as well as other manufacturers.

Figure 23:
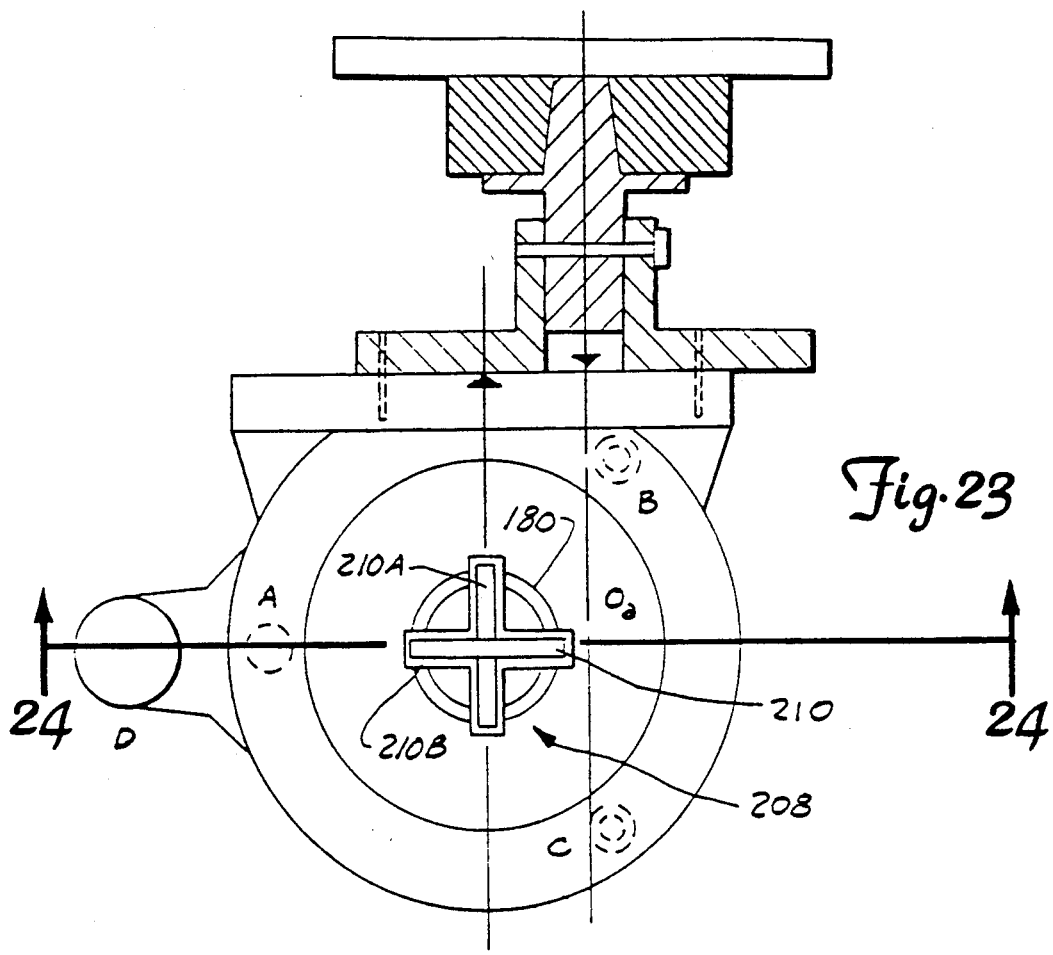
FIG. 23 is a top sectional view of the calibration device having a positioning sensor.
Figure 24:
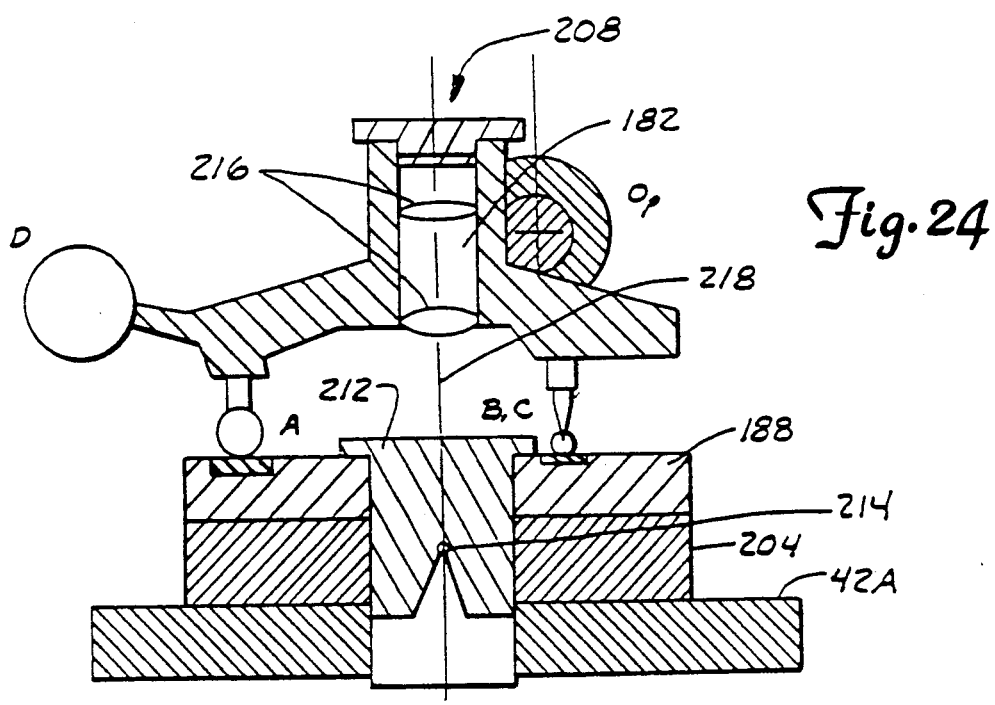
FIG. 24 is a side sectional view of the calibration device taken on line 24—24.

A typical PSD sensor 208 is illustrated in FIGS. 23 and 24. A light sensor 210 is installed on an end of the hub 180 and fits closely inside the bore 182. The light sensor 210 has cross-hair type alignment devices 210A and 210B with these elements crossing precisely in the center of the bore 182. A precisely machined light holder 212, illustrated in FIG. 24, is positioned in the bores of the arbor 204 the spacer 188 and into the gear spindle bore in carriage 46. The light holder is held in place. A source of light 214 is supported at the center of the light holder 212. The source of light 214 will project light through the light holder 212 along the gear spindle axis. If desired, depending upon the type of light emitted, a plurality of lenses 216 can be placed in bore 182 to focus the beam of light indicated at 218. The light senor 210 is light sensitive and will emit a representative signal if received from either elements 210A or 210B. The gear carriage 46, mounting surface 42A and thus the arbor 204 is moved along the X and Y axes until equal representative signals are obtained from both of the elements 210A and 210B along suitable signal lines, and the bore for mounting the gear spindle 44 is precisely aligned with the bore 182 in hub 180. The gear spindle axis 48 when installed is then precisely and properly positioned relative to the pinion spindle 17 and axis 26.

The actuators move the gear carriage 46 to accomplish positioning in alignment and when the carriage is properly positioned or calibrated, the actuator controls can be set to a centered "zero" position, which will indicate the initial conditions. Programmed testing then can be used for adjusting the actuators to change different parameters for the tests in a known manner, such as changing the shaft angle, hypoid offset, or the like to simulate deflections of an actual gear carriage on which the gear set would be mounted. The tests permit an operator to determine the possibility of noise or wear.

MATHEMATICAL ANALYSIS OF CONTROL

As discussed above, the suspension system utilizing the actuators can provide all six degrees of freedom for the gear carriage 46 as a free body in three dimensional space. Actually, simple analysis will show that for relative orientation of the pinion axis relative to the gear axis, only four degrees of freedom are needed. These degrees of freedom are movement along the hypoid offset line called the vertical position (V); movement along the pinion axis, or the pinion mounting distance which is the pinion axial position (H); movement along the gear axis which is called the gear mounting distance (Q); and the shaft angle (S). The remaining two degrees of freedom, namely rotation about the spindle axis and rotation about the gear axis, are not controllable or important in that both of these are controlled by bearings in their respective housings.

Since only four degrees of freedom are required, two solid rods or struts can be substituted when it is desired. The fact that two solid rods can be used illustrates the difference between the actuator system degrees of freedom and the task system degrees of freedom. However, an actuator system having six degrees of freedom can be used to perform a task needing only four degrees of freedom. An analysis of the positioning of the gear and pinion can be described by showing that there are three domains or sets of controlled parameters that have to be considered. The first domain is a set of parameters for gear spindle position relative to the reference coordinate system space that is illustrated in FIG. 18. The pinion spindle has been chosen as the stationary spindle, which forms a reference to the overall coordinate system. The pinion spindle allows rotation of the pinion about its axis, but the pinion spindle housing is fixed to the frame and can be considered part of the frame. The position and orientation of the pinion spindle housing, as described above, is fixed in the reference coordinate system, which can always be established for the base or frame. The position of the gear carriage can be given by a set of parameters called world gear spindle position in the reference coordinate system. The first domain, namely the world domain, is identified by six coordinates comprising three linear coordinates and thee angular coordinates. The center of the gear coordinate system $S_G$ is defined by orthogonal axes $X_G$, $Y_G$, $Z_G$, with an origin on the gear spindle axis at the crossing point $O_G$ shown in FIG. 18 as a reference point for the three linear coordinates. Three angular coordinates pitch ($\alpha$), roll (B), and yaw ($\gamma$) about the mutually orthogonal axes $X_G$, $Y_G$, $Z_G$, respectively, further define the gear spindle position. It should be noted that pitch ($\alpha$) has been designated as the angle of rotation of the gear spindle about the pinion spindle axis, and yaw ($\gamma$) has been designated as the rotation of the gear about its own axis, while roll (B) is the rotation of the gear about an axis perpendicular to the pinion spindle axis.

The second domain for identification is a subset of the world coordinates and can be identified specifically with a particular gear set. It is called, for purposes of this discussion, the tester domain or coordinates. They are H, V, Q and S. There is a relationship between the world domain coordinates $X_G$, $Y_G$, $Z_G$, $\alpha$, B, and $\gamma$ and the tester domain:

$H = H (X_G, Y_G, Z_G, \alpha, B, \gamma)$      Equation 1a $V = V (X_G, Y_G, Z_G, \alpha, B, \gamma)$      Equation 1b $Q = Q (X_G, Y_G, Z_G, \alpha, B, \gamma)$      Equation 1c $S = S (X_G, Y_G, Z_G, \alpha, B, \gamma)$      Equation 1d The system of equations 1a–1d above can be derived based on the geometry of the systems and the overall topology of the tester. There are two processes which are associated with the equations 1a–1d, namely direct and inverse transformations. As can be seen from equations 1a–1d above, the system is easily solved for any combination of world coordinates ($X_G$, $Y_G$, $Z_G$, $\alpha$, B, $\gamma$) by direct transformation. When the tester coordinates are given, namely H, V, Q and S, then inverse coordinate transformation is used to solve for the world coordinates. However, there exists an infinite number of solutions for world coordinates since the number of world degrees of freedom equals six, which is greater than the number of tester coordinates degrees of freedom, which is four. Thus, two out of the six world coordinates must be kept fixed or two more conditions in tester coordinates must be specified for a unique solution of the inverse transformation. In the real or actual test set up, two angular parameters, namely yaw ($\gamma$) and pitch ($\alpha$), which are rotation of the gear about its spindle axis and the rotation of the gear spindle about the pinion axis, can be kept fixed.

A third or actuator domain also has to be considered because of the actuator coordinate system used. As stated, there were six actuators shown, and the actuator domain can be represented by the number of active actuators used to control the suspended gear carriage and thus the position of the gear spindle and gear. The gear carriage 46 as shown in FIG. 1, for example, is supported on three substantially vertical actuators and can be further controlled by three substantially horizontal actuators. In a given system, the number of actuators or the actuator degrees of freedom can vary from 0 to 6. If the actuator degrees of freedom equals 0, then all of the actuators are replaced by rods or struts with a fixed length and thus the system is fixed so the gear cannot be moved in space or with respect to the pinion. In contrast, when all six "legs" for support are actuators, the system has the maximum possible degrees of freedom in three dimensional space. The intermediate cases are when some of the actuators, but not all are replaced by fixed length struts. The relationship between all three of these domains (world, tester and actuator) can be established. This relationship is non-linear and the process of converting information given in one domain into equivalent information in another domain can be a time consuming process. The process is known as coordinate transformation.

The coordinate transformation can be direct or inverse, and the direct transformation as stated previously between the actuator and world coordinate domains is used when the actuator coordinate information is given and the world coordinate information must be obtained. Again, the world coordinates are in the fixed coordinate system shown in FIG. 18. The inverse transformation is when the world coordinates are given and the coordinate actuator information (i.e. the length of each actuator) must be obtained. When all six actuators are used, both the direct and inverse transformation tasks have unique solutions, but complex mathematical operations must be made. These operations can be carried out by known programming methods on a computer. The world coordinates cannot be controlled directly, that is, the reference system shown in FIG. 18 cannot be directly controlled with the six actuators, but rather only through a proper control procedures applied to the actuator system can the proper positioning of the gear spindle relative to the pinion spindle be achieved. A similar transformation must be developed between the world and tester domains.

After all of the control domains are identified for any given testing condition (H, V, Q and S), the world coordinates can be established and then desired actuator commands can be given as a command input to servo-valve controls for the actuators which use position feedback circuitry to precisely control actuator position. Inverse opposite transformations can then be used to reestablish current testing conditions based on the feedback information from the actuators by converting this information into the world domain and the into the tester domain. By utilizing these transformations, it can be determined whether the gear spindle is in its proper location.

A redundancy factor of the actuator system also has to be considered in deriving the transformations. In the case of all six actuators used to support the gear carriage and thus the gear spindle and gear, the actuator system is capable of doing more than is necessary to perform prescribed testing requirements, which requires only four degrees of freedom. This actuator system still can be used, but two more conditions or constraints have to be added, such as a limited overall actuator stroke or some other factor that will permit solving the transformations.

Figure 15:
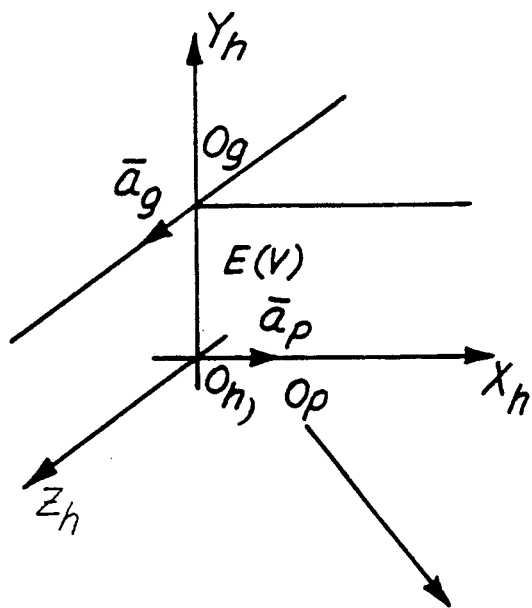
FIGS. 15-20 are vector diagrams used to illustrate relative positions of a gear and a pinion in the gear tester of the present invention.
Figure 16:
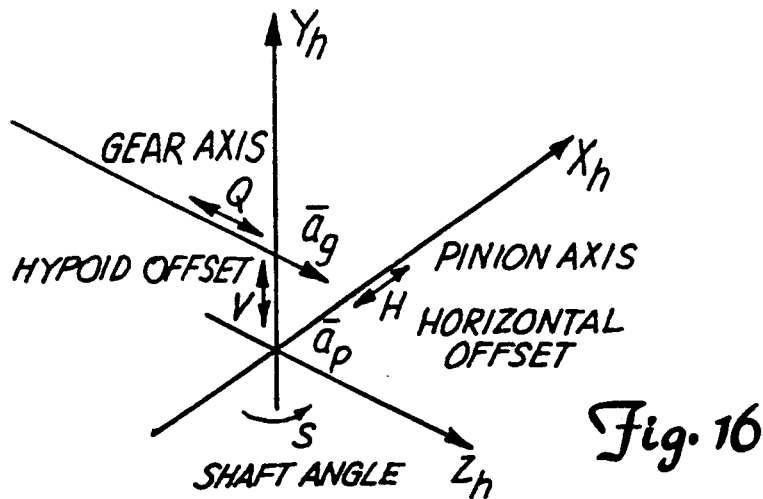
Figure 17:
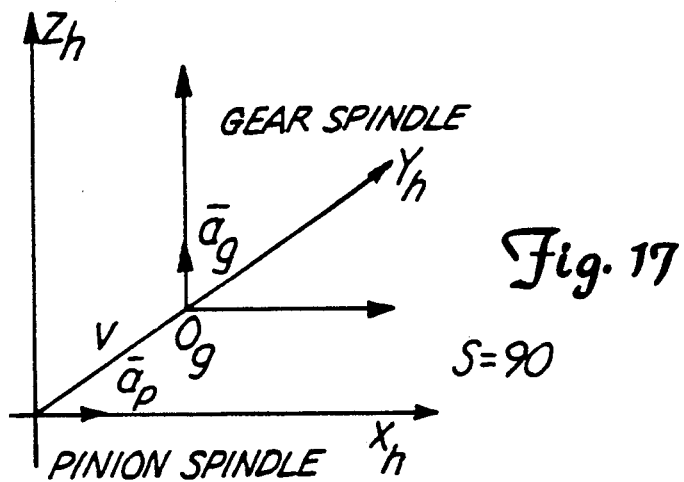

In the drawings, FIGS. 15-20 and 25-31 are vector representations of conditions that are considered in the transformation between domains. FIGS. 15, 16 and 17 are vector diagrams illustrating the position of the gear with respect to the pinion and a reference coordinate system ($S_{base}$) comprising three mutually perpendicular axes $X_h$, $Y_h$, and $Z_h$. The coordinate system ($S_{base}$) is considered to be fixed to the gear tester frame 10. FIG. 15 illustrates the relative position of the gear to the pinion. Where V is the hypoid offset, $O_g$ and $O_p$ are the origins of the gear and pinion, respectively, and $\bar{a}_g$ and $\bar{a}_p$ are directional vectors for the gear and pinion, respectively. Since the pinions are fixed to the gear tester frame, the pinion origin, $O_p$, is located at the reference origin, $O_h$.

Rotating the coordinate system of FIG. 15 by 90 degrees about axis $y_h$, FIG. 16 illustrates all four degrees of freedom or changeable settings H, V, Q and S. FIG. 17 is similar to FIG. 16 but rotated about axis $X_h$ and with the shaft angle S equal to 90 degrees.

Figure 25:
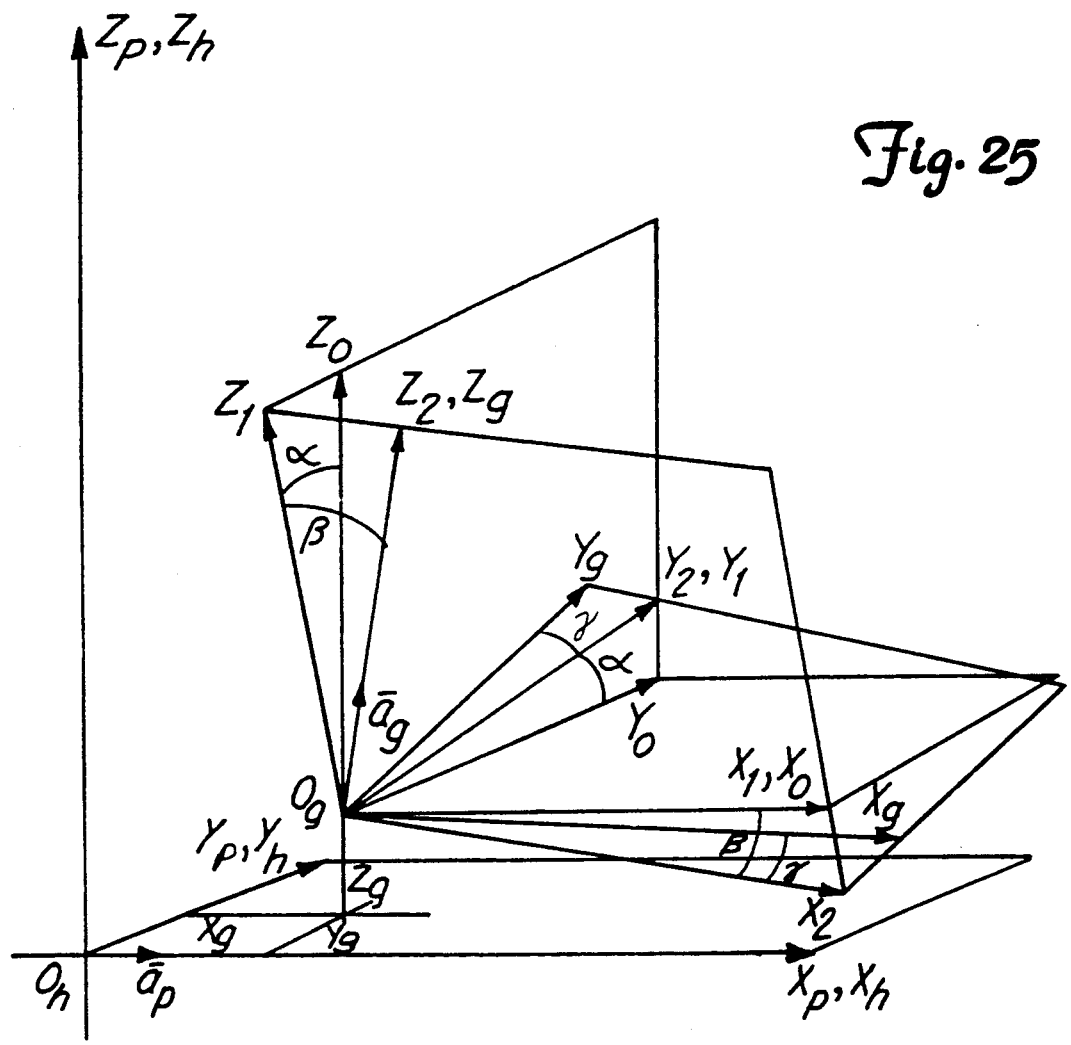
Figure 29:
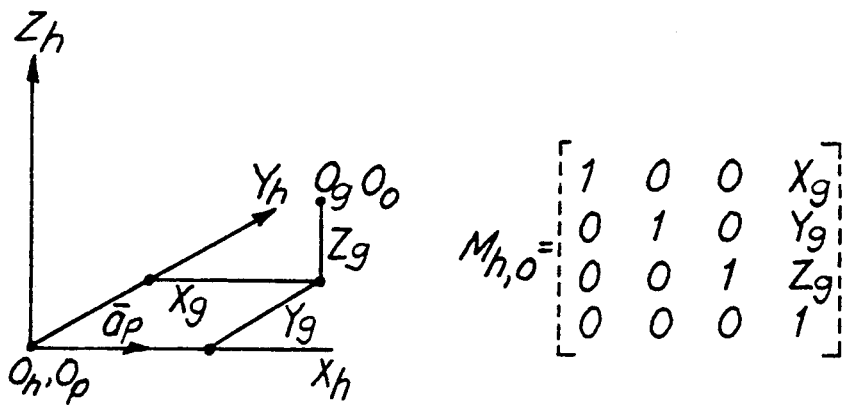
Figure 30:
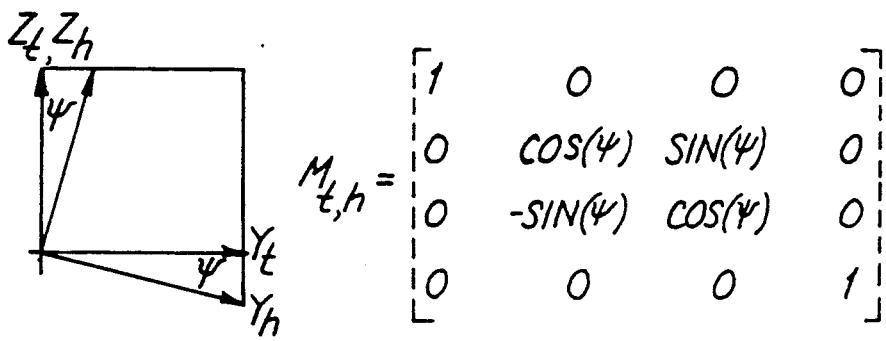

The relative position and orientation of both the pinion spindle and the gear spindle can be specified by six world coordinates, previously mentioned (three linear coordinates and three angular coordinates), shown in FIG. 25, and can be broken into four matrix transformations presented by FIGS. 26, 27, 28 and 29. The matrices are $M_{h,o}$; $M_{o,1}$; $M_{1,2}$; $M_{2,g}$. The directional vector of the gear axis, that is the axis of the gear spindle, can be transferred from the coordinate system $S_g$ to the reference coordinate system $S_h$ by the following equations:

$$M_{h,g} = M_{h,0}M_{0,1}M_{1,2}M_{2,g}$$
as:
$$\bar{a}_h^{(g)} = M_{h,g}\bar{a}_g^{(g)}$$
where:
$$\bar{a}_g^{(g)} = \begin{bmatrix} 0 \\ 0 \\ 1 \\ 0 \end{bmatrix}$$

After the above transformations have been completed, vector $\bar{a}_h^{(g)}$ will have a certain orientation with respect to coordinate system ($S_{base}$). A new tester coordinate system $S_t$ can then be established with its origin at point $O_h$ but rotated around the axis $X_h$ by the angle $\psi$, which is defined such that in coordinate system $S_t$, vector $\bar{a}_g$ is parallel to the plane $X_t$, $O_t$, $Z_t$, or in other words, the projection of this vector onto axis $Y_t$ equals zero. Therefore:

$$\{\bar{a}_t^{(g)}\}_y = \{\bar{a}_g^{(g)}\}_y \cos(\Psi) + \{\bar{a}_g^{(g)}\}_z \sin(\Psi) = 0$$

Then, the angle $\psi$ can be found as:

$$\tan(\Psi) = -\{\bar{a}_g^{(g)}\}_y / \{\bar{a}_g^{(g)}\}_z$$

Figure 31:
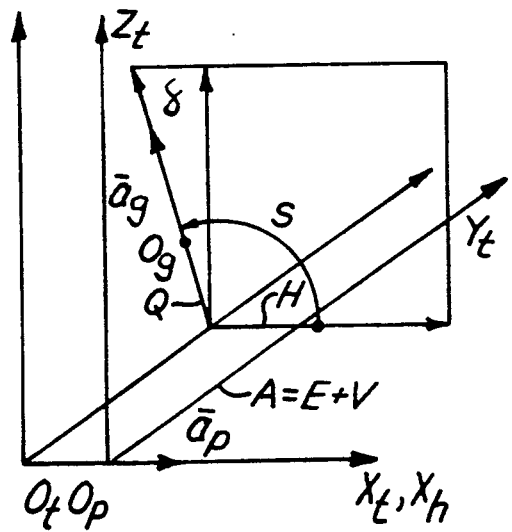

FIG. 31 illustrates the final position of the gear axis in a tester coordinate system with all four tester coordinates (H, V, Q, S) and four scalar equations:

$$\{\bar{r}_t^{(og)} - Q\bar{a}_t^{(g)}\}_z = 0$$
$$H = \{\bar{r}_t^{(og)} - Q\bar{a}_t^{(g)}\}_x$$
$$V = \{\bar{r}_t^{(og)}\}_y - E$$
and
$$\sin(\delta) = \{\bar{a}_t^{(g)}\}_x$$

Where:

$$\bar{r}_t^{(og)} = M_{t,g}\bar{r}_g^{og} = M_{t,g}\begin{bmatrix} 0 \\ 0 \\ 0 \\ 1 \end{bmatrix}$$

The transformation shown above and in the FIGS. 26-31 couple together the world and tester domain parameters. In actuality, the tester domain is controlled by the actuator system and, as a result, the additional transformation between tester coordinates and the actuator commands through the world domain must be developed. In other words, the tester coordinates are given, and the software which controls the test apparatus is programmed to be capable to create a set of command signals for the actuator servovalves to provide the desired tester and world positions. As stated above, two additional conditions of the tester system must be used for the unique solution and yaw and roll are kept fixed to aid in the solution.

ANALYSIS OF FORCES AND LOADING

Figure 32:
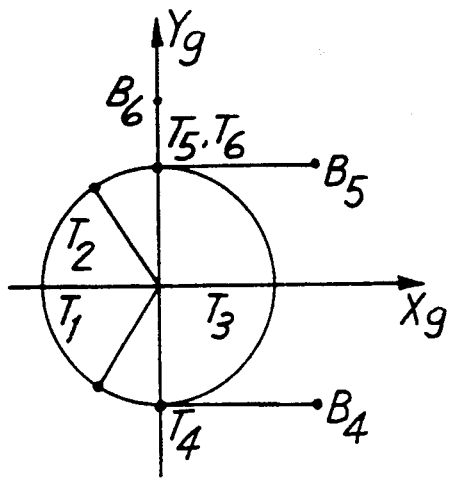
FIGS. 32-34 are schematic representations of the coordinate system applicable to the gear carriage of the present invention.
Figure 33:
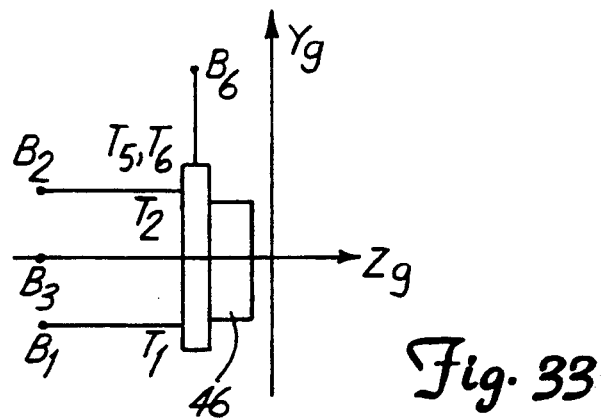
Figure 34:
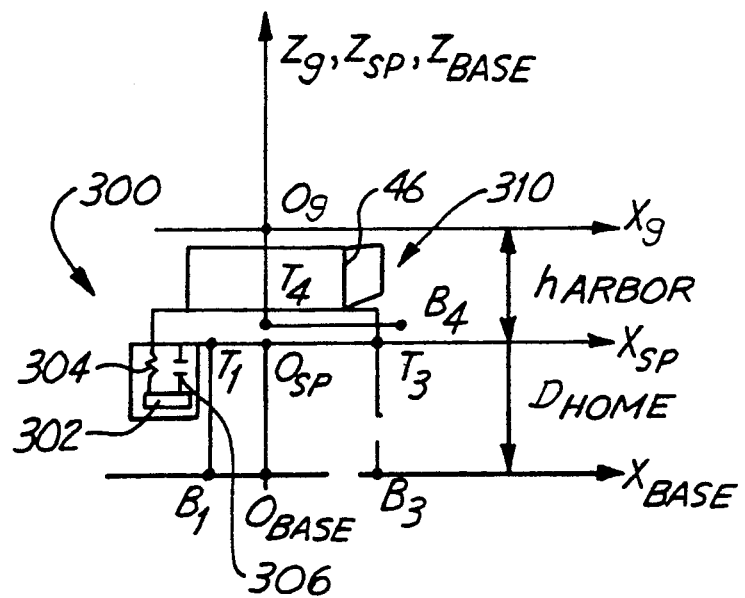

FIGS. 32, 33 and 34 are schematic representations of the coordinate system applicable to the gear carriage 46, and each of the individual actuators such as those shown at 52A-52C, 56A-56C or at 70A-70C, 76A-76C in the embodiments of FIGS. 1, 2, 3 and 7. For analysis purposes, the type of coupling, including the actuators fixed to the gear spindle carriage and an intervening strut between the actuator and the gear spindle carriage will be considered. While the forces and analysis have been illustrated before, FIGS. 32, 33 and 34, in particular, graphically represent the coupling of the actuators to the gear spindle carriage.

In each of FIGS. 32, 33 and 34, the subscript designations of "T" indicate the connections of individual actuators to the gear carriage 46 utilizing ball joint (universal swivel) connectors. The subscript designations of "B" indicate the individual connections of the actuators or strut on a pivoting joint to the base frame 10.

It should be noted that since gear carriage 46 is mounted on movable actuators, a resonant frequency for each degree of freedom is present. If the natural resonant frequency in a given degree of freedom is unacceptable during gear testing operation, tuned mass dampers of conventional design can be applied to the system to reduce the influence of these frequencies. Schematically, the tuned mass damper is illustrated at 300 in FIG. 34. The tuned mass damper 300 includes a selected mass element 302 connected to the gear housing through a spring element 304 and a damping element 306. Similar tuned mass dampers, such as 310, can be mounted to the gear carriage 46 at other locations to reduce the influence of other resonant frequencies.

Figure 35:
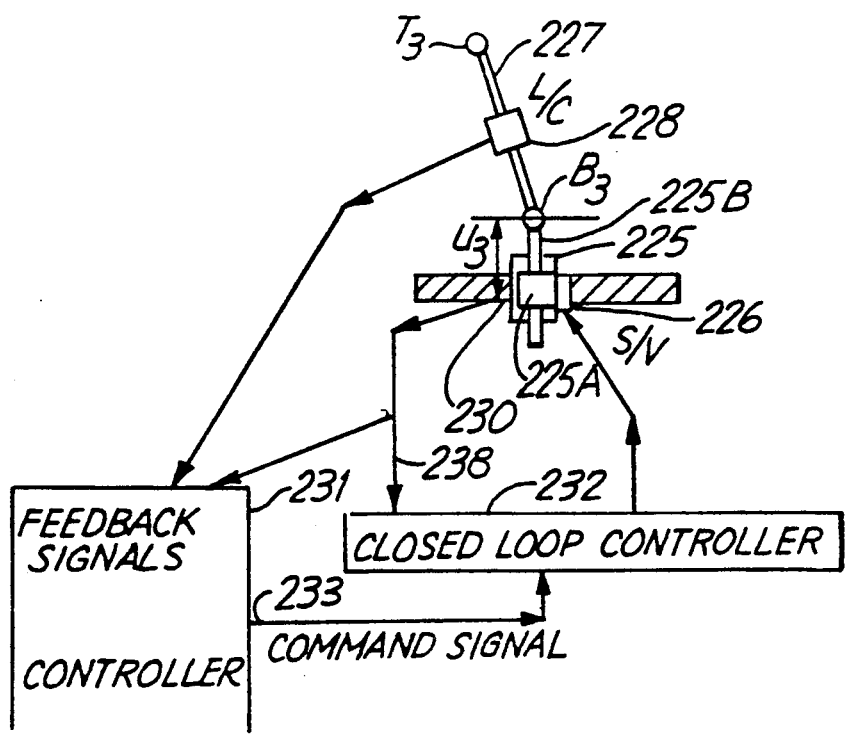
FIG. 35 is a schematic representation of an actuator and actuator control system.

FIG. 35 is a schematic representation of a typical actuator 225. The actuator 225 is essentially actuator 70C shown in FIG. 3, inasmuch as the actuator indicated generally at 225 is mounted onto the base 53 and has an internal piston 225A that is operable in opposite directions to move a rod 225B. The actuator 225 is controlled with a servovalve 226, while a strut 227 is connected at B3 to the actuator rod 225B with the opposite end of the strut connected at designation T3 to the gear carriage 46. A load cell 228 is provided in the strut, or the strut itself could comprise the load cell as previously explained with reference to FIGS. 9 and 10.

An LVDT signal indicating the displacement of the piston 225A is provided from an LVDT sensor shown schematically at 230. The controls are standard closed loop servovalve controls, and a closed loop controller 232 of conventional design is provided to give signals to the servovalve 226 and to receive signals from the LVDT indicating the position of piston 225A, so that an error signal control is maintained. In addition, the load cell 228 provides a load feedback signal to a main digital controller or mastercontroller indicated at 231, which further receives position signals from the LVDT 230 and signals indicating applied forces from load cell 228. A command signal is provided along the line 233 to the closed loop controller 232 which will command the movement of the actuator 235 as a function of the desired test, and the desired positions of the gear spindle relative to the fixed pinion.

Figure 36:
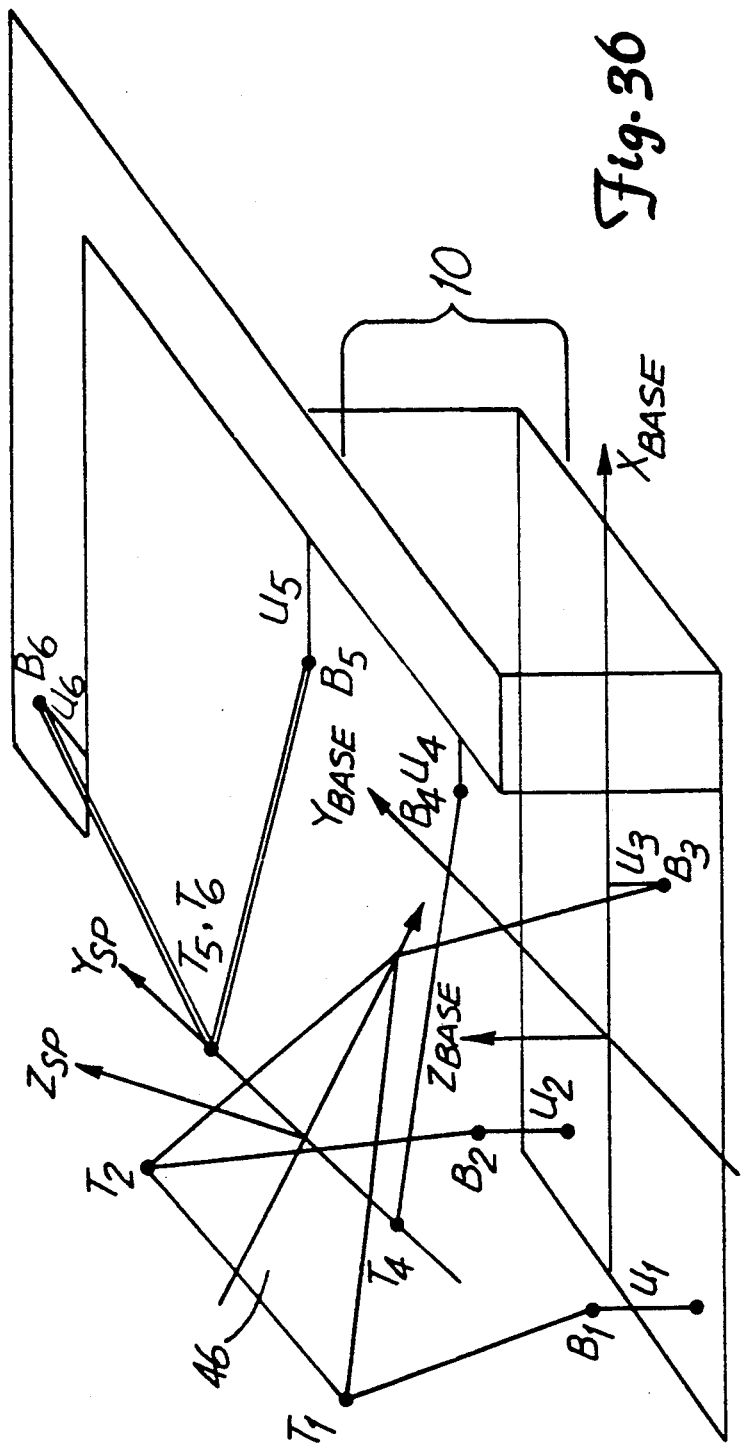
FIG. 36 is a vector diagram illustrating actuator support of the gear carriage relative to a fixed frame.

Referring now to FIG. 36, a three-dimensional vector diagram represents support of the gear spindle carriage relative to the fixed frame 10. $T_1$, $T_2$, $T_3$ represent the coupling of vertical actuators/struts to the gear carriage, while $T_4$, $T_5$ and $T_6$ represent the coupling of horizontal actuators to the gear carriage. The vertical actuators are designated $U_1$, $U_2$, $U_3$, and the horizontal actuators are designated $U_4$, $U_5$ and $U_6$. The connections between the base ends of the struts and the actuators are designated by the reference character "B" with the appropriate subscript as the corresponding actuators ($B_1$, $B_2$, etc.).

The frame 10 is represented in FIG. 36 schematically to show that it provides support for the various actuators. The orientation of the connections $T_1$, $T_2$ and $T_3$ shows the corrections or modifications that have been made to essentially correspond to the position changes for errors indicated in FIG. 20. Again, in further analysis the designation "U" will be in relation to the individual actuators utilized for controlling the position of the gear carriage 46 in space.

Figure 37:
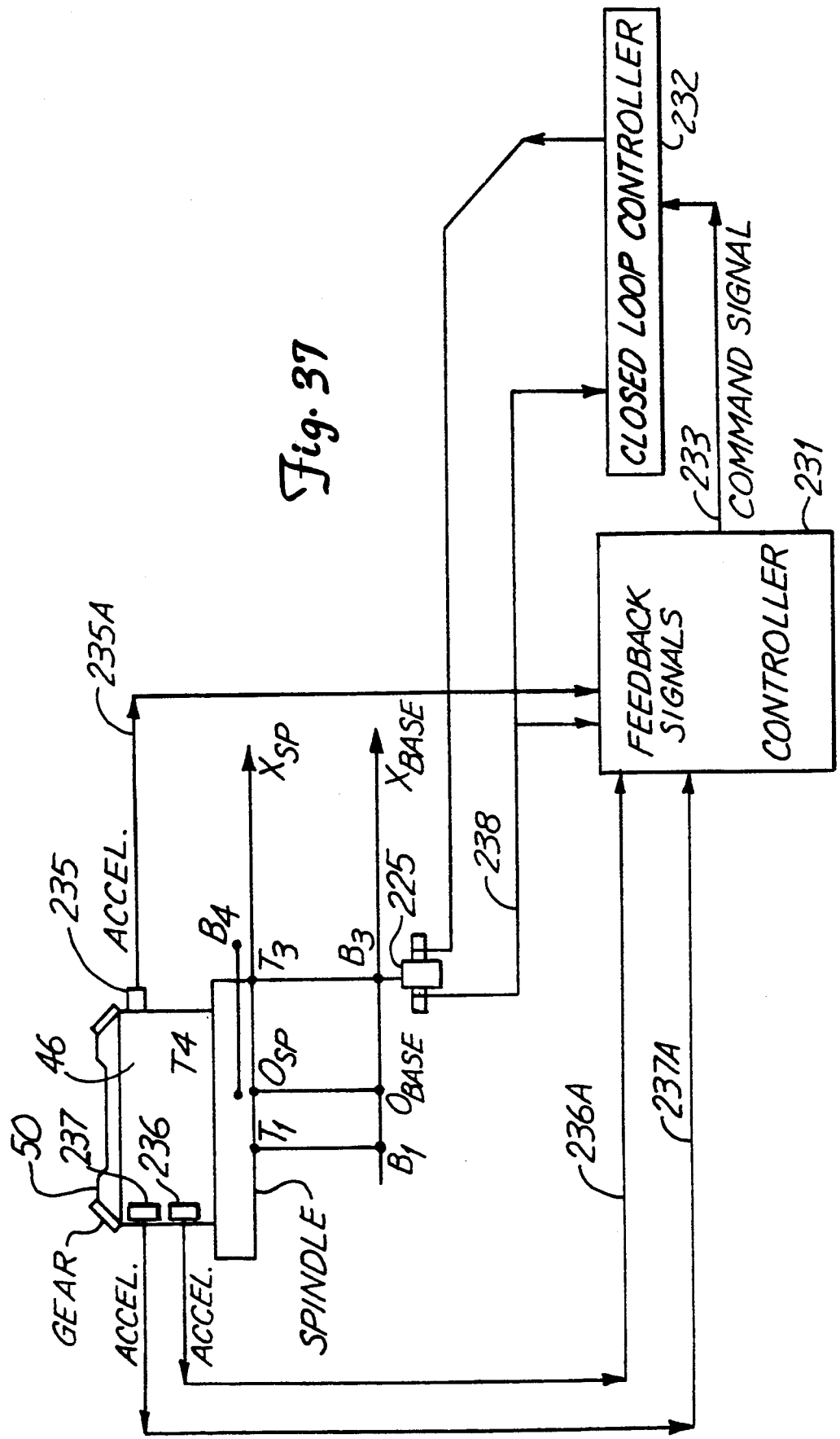
FIGS. 37 and 38 are schematic representations of instrumentation and controllers used to control the actuators of the present invention.
Figure 38:
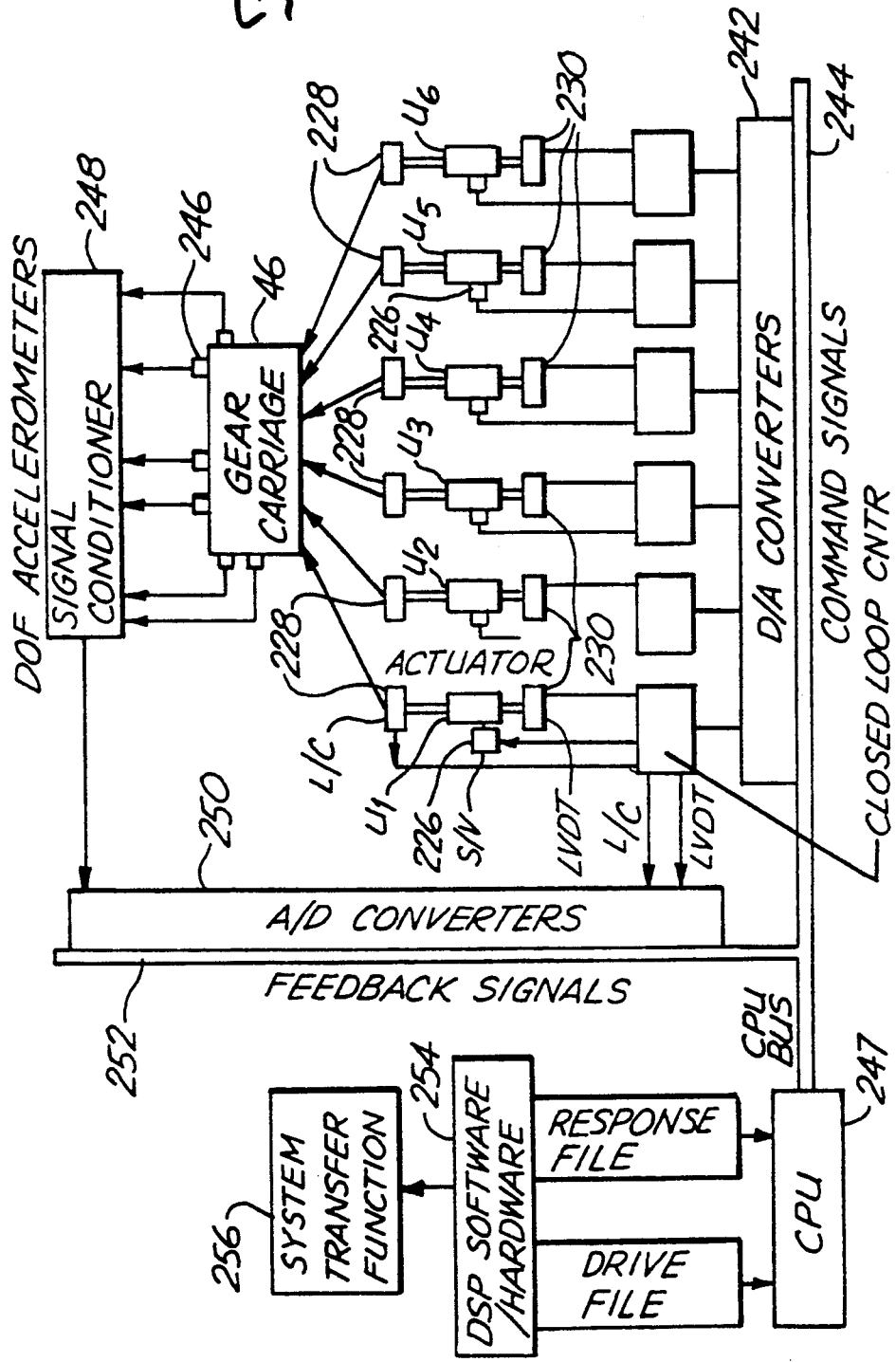

FIGS. 37 and 38 are schematic representations of instrumentation and controllers utilized for controlling the actuators of the present invention. As shown in FIG. 37, the gear carriage 46 has a gear 42 and spindle supported thereon, which includes accelerometers 235, 236 and 237. The accelerometers provide feedback signals to the controller that is shown schematically at 231 in FIG. 37. The individual actuators shown are constructed as the actuator indicated at 225 and described with reference to FIG. 35 through a closed loop controller 232 that receives position feedback of the piston 225A along a line 238. The accelerometer representative output signals are transmitted to the master controller 231 along lines 235A, 236A and 237A. The output signals from the accelerometers 235, 236 and 237 represent forces on the gear carriage and are used for providing control to the individual actuators and commanding the actuators to a position wherein accelerations or vibrations of the gear carriage 46 are minimized.

In FIG. 38, a more expanded schematic representation of a control system is illustrated. Each of the actuators is represented at $U_1$-$U_6$, and each includes a load cell 228 and an LVDT 230, and each is controlled by a servovalve 226. The closed loop controllers 232, as illustrated in FIG. 35, are utilized and their command signals come from digital to analog converters, indicated at 242, which receives signals along a bus 244 from a central processing unit (CPU) 247. As with the embodiment illustrated in FIG. 37, the gear carriage 46 is provided with a plurality of accelerometers. While the accelerometers were individually numbered in FIG. 37, a general number of 246 is used for the accelerometers on the gear spindle carriage 46 in FIG. 38. The accelerometers 246 can be mounted in any suitable position to determine accelerations along the various degrees of freedom. Outputs from the accelerometers are provided to signal conditioning circuits represented generally as 248 that processes the accelerometer output signals into suitable form for conversion in an A/D converter 250 (one for each signal). The A/D converters 250 provide feedback signals along a bus 252 to the CPU 247. The CPU 247 has suitable parameters stored in memory to analyze the existing conditions of the tester system and respond using an appropriate algorithm embodied in a suitable program stored in memory 254. The algorithm takes into account the particular system transfer function 256, which can be derived, as previously shown, and modified in a manner that is well within the skill of a programmer in the field.

Figure 39:
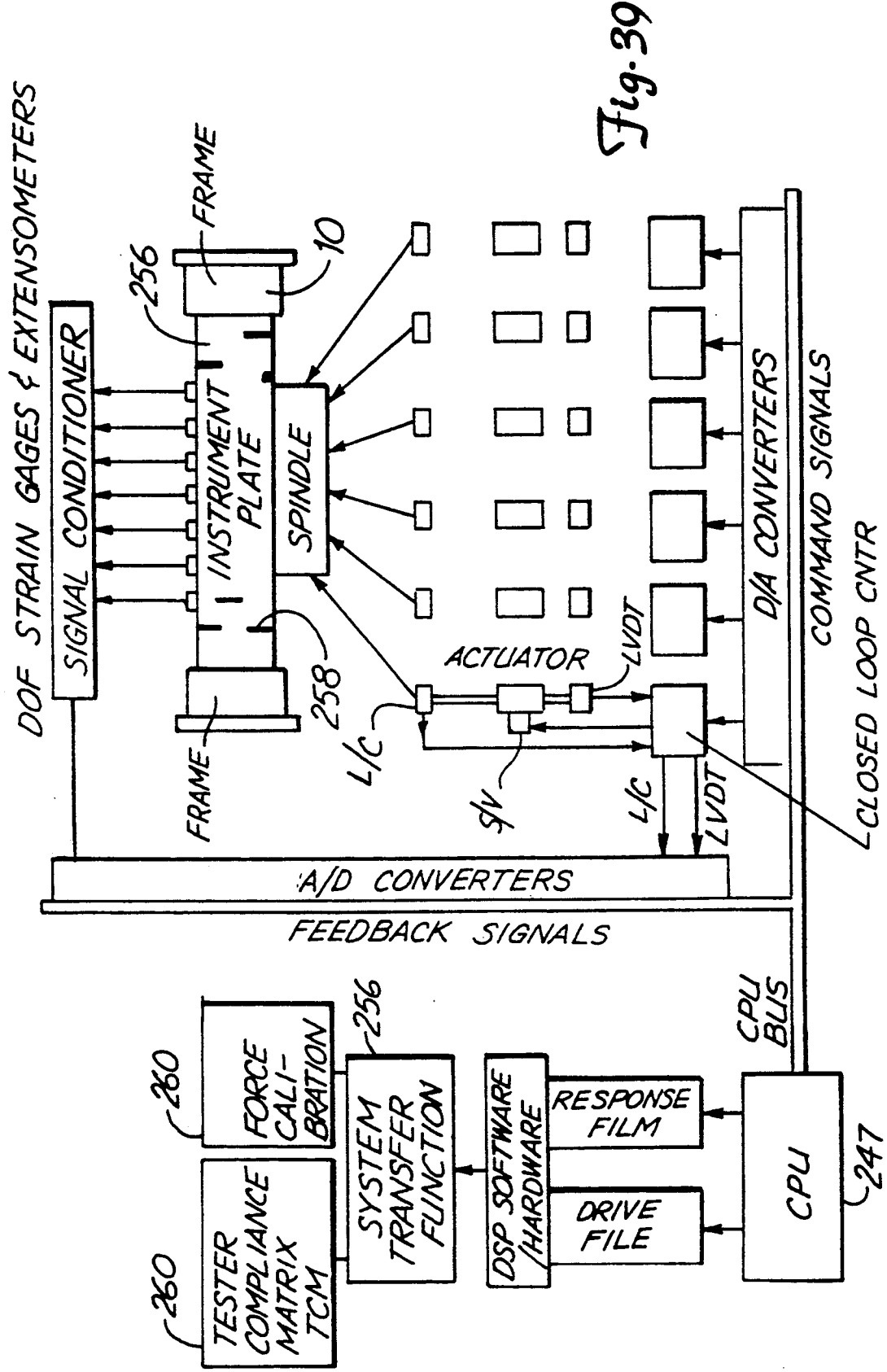
FIG. 39 is a schematic representation of a controller system having a force calibration plate.

FIG. 39 illustrates the same overall system as that shown in FIG. 38, except an instrumented plate 256 that would have a number of individual force measuring load cells thereon is illustrated. The instrumented plate 256 is used during force calibration of the system. The instrumented plate 256 is supported onto the frame 10 in the desired location over the gear aperture in Table 16. The instrumented plate 256 includes strain gauges and/or extensiometers illustrated schematically at 258. The feedback signals from the strain gauges and/or extensiometers are again provided to the central processing unit 247, and the system transfer function 256 in this case includes a force calibration input 260 which provides indications of system deflection under particular forces for calibrating the position of the respective actuators when known forces are applied to the instrumented plate 256. The known loading on plate 256 causes deflections which result in known positions of the actuators. The positions of the actuators under these loads is a function of the spatial flexibility of the gear tester system thus by causing the actuators to move to these positions the applied loads are then also known.

In the preferred embodiment, a tester compliance matrix 262 is provided as part of the system transfer function and control software. The instrumented plate 256 permits one to measure the transfer of forces through the gear system to the gear spindle housing 46. The tester compliance matrix allows inputs related to the dynamics of the gear tester system. Specifically, the tester compliance matrix information relates to the stiffness of the customer's gear housing, which is related to the gear set up so that the spatial stiffness of the customer's gear housing becomes an input into the test arrangement. If there is compliance in the real world gear housing that mounts gears, the gear test system will move to simulate that compliance so that the loads on the gear spindle, gear and pinion are a representation of what occurs in actuality in the field. How much the gear spindle housing should sag for example is stored as a matrix, and the difference between the actual gear housing that would mount the gears and the test system is compensated by movement of the actuators to obtain the necessary deflection. For example, if the test system is stiffer than the customer's housing, then the actuators will move it to simulate the compliance.

MODES OF DISPLACEMENT CONTROL

As described above, computer controls can be utilized to control the gear tester system, but an operator also can manually control the position of the gear carriage 46 and, thus, the gear spindle 44 relative to the pinion spindle 17. The different modes of control relate back to the various domains that were mentioned. These include "world control" where gear carriage 46 is moved as a function of commands sent to the controller in terms of the world coordinate system, which is rigidly connected to the gear spindle carriage relative to the established reference coordinate system. This procedure was previously described with references to FIGS. 18, 19 and 20 and the compensations can be made by adjusting the actuators and the gear carriage relative to the base coordinate system.

A second way of controlling the system is with actuator control (actuator domain) where the actuators themselves are controlled as to their position for establishing the gear carriage position. The inputs would be a function of the desired position of the actuators, and then the control would be operated to maintain the actuators in this desired position. The tester coordinate control, which is related to the use of the tester compliance matrix is a third mode of control.

There is no unique relationship between the world or actuator coordinates and the tester coordinates, so it is difficult to obtain this information. However, as will be shown, the problem can be approached in a number of ways. The tester coordinate system, as previously mentioned, has only four degrees of freedom (H, V, Q and S), while the world or actuator systems have six degrees of freedom.

One of the simplest ways to solve the problem for test coordinate control is to reduce the degrees of freedom in the world domain by use of two struts in place of two actuators, or by keeping two out of the six actuators fixed. $U_1$ and $U_4$ would be constant length actuators or struts, or in other words:

$$\Delta U_1 = 0 \text{ and } \Delta U_4 = 0.$$

In this way, the degrees of freedom of the actuator system are reduced and the unique solution can be obtained.

A second approach is by keeping $U_1$ equal to $U_2$ and $U_4$ equal to $U_5$. This is equivalent to adding two more conditions to the system besides the tester mounting conditions, and permits solving the control problem.

A very similar approach can be reached by keeping two world angular coordinates, $\alpha$ and $\gamma$ equal to zero. Yet another approach would be to minimize the overall stroke of all six actuators, which is perhaps the most efficient, but requires additional consideration. Specifically, in order to minimize actuator stroke, the following equation must be minimized.

$$\rho = \Delta u_T \Delta u$$

which brings:

$$grad(\rho) = 0$$

Alternatively, in terms of $\Delta u$, the following relationship is realized.

$$\Delta u = -[C^T C]^{-1} [C^T] \Delta T$$

Where matrix C is a 4 by 6 Jacobian matrix of partial derivatives, which ca be rewritten as:

$$\Delta T = [C] \Delta u$$

As described above and illustrated in FIGS. 1-3 and 7, the gear carriage 46 is supported by three vertical actuators. The vertical actuators are separated from one another by 120° and fixed to the frame 10 at locations that lie in a circle generally circled on gear spindle axis 48. Support for the gear carriage 46 in a horizontal plane generally perpendicular to axis 48 is provided by two actuators operating in orthogonal directions to each other. A third actuator is provided parallel to one of these horizontal actuators.

There are trade-offs between using six actuators or four actuators. With six actuators, it is a more flexible system, less actuator stroke is required, and they are easier to control. On the other hand, it is the cost of two extra actuators plus the controllers. Additionally, fixed struts or rods can be made stiffer than the actuators, so the overall system is stiffer, which is desirable. With four actuators, the system is cheaper and stiffer, but it needs special programming or software to control it and the control becomes more complex. It also requires more stroke to perform the same test envelope. The system shown in FIGS. 3 and 7 is the most desired by having three vertical actuators all active and the horizontal actuators range so the two are parallel and one is at right angles to the two. This provides maximum structural stiffness and thus control flexibility, particularly where the actuators are fixed to the frame. When the actuators are fixed to the frame, they have a smaller column of oil and a stiff strut can be used between the actuator rods and the gear spindle carriage.

In terms of world coordinates actuator stroke can be minimized by first dividing all world coordinates into two groups:

$$W_1 = (X_g, Z_g, \beta)$$

$$W_2 = (\alpha, \gamma)$$

The vector $\Delta U$ and vector $\Delta W$ have the following relationship:

$$\Delta U = [A] \Delta W$$

where [A] is a Jacobian matrix of partial derivatives, which can also be written as:

$$\Delta U = [A_1] \Delta W_1 + [A_2] \Delta W_2$$

To minimize actuator stroke, the following equation is minimized:

$$\rho = \Delta U^T \Delta U$$

which brings $$grad(\rho) = 0$$

or the following relationship:

$$[A_2^T A_2] \Delta W_2 + [A_2^T A_1] \Delta W_1 = 0$$

or for $\Delta W_2$ $$\Delta W_2 = -[A_2{}^T A_2]^{-1}[A_2{}^T A_1]\Delta W_1$$

With four active actuators and two struts represented by a corresponding $\Delta u$ equal to zero, as described above, the following relationship exits:

$$\begin{bmatrix} \Delta u_1 \\ 0 \\ \Delta u_3 \\ 0 \\ \Delta u_5 \\ \Delta u_6 \end{bmatrix} - [A_2]\Delta W_2 = [A_1]\Delta W_1$$

which can be rewritten as:

$$[B]\begin{bmatrix} \Delta u_1 \\ \Delta u_3 \\ \Delta u_5 \\ \Delta u_6 \\ \Delta \alpha \\ \Delta \gamma \end{bmatrix} = [A_1]\Delta W_1$$

where matrix [B] can be easily recreated. The vector $\Delta U$ and $\Delta W_2$ can be then obtained as:

$$\begin{bmatrix} \Delta u \\ \Delta W_2 \end{bmatrix} = [B]^{-1}[A_1]\Delta W_1$$

Similar results can be obtained for situations involving five or six actuators.

TESTING PROCEDURES

Testing procedures to be carried out involve loading the gear spindle with a suitable brake, such as that shown schematically in FIG. 9 and determining the performance of the gear, such as gear noise, or by analyzing the contact area of the pinion teeth with the gear teeth under different load conditions. Adjustments then would be made to the actuators through the command system, either by utilizing feedback such as a noise feedback in order to permit determining what may improve the performance of that testing parameter. For example, if noise feedback is utilized, adjustments can be made to the actuator system to change the gear spindle carriage in its position until the noise is minimized.

If an analysis of the gear contact area is made, then observations can be made under a strobe light or the like to determine the gear contact area. Adjustments can be made to the gear carriage position through the actuators to move the gear relative to the fixed pinion actuators to see if the gear and pinion contact changes in contact area or position. Wear can also be monitored by running the gears and then changing positions to see how they run in.

Sometimes gear testing will go on for hours, and if consistently there are errors in sets of gears coming from a particular machine, the information on the settings where the best running conditions are obtained can be provided to the machine for changing the manufacturing parameters of the gear sets.

COMPLIANCE MATRIX [SCM] TECHNIQUE

The gear tester control system illustrated in FIGS. 37 and 38 can be programmed to account for gear housing deflections and suspension system deflections. With regard to gear housing deflections, a compliance or flexibility matrix [SCM] can be determined from the following relationship:

$$[SCM][F_w] = [\Delta D_w]$$

where $F_w$ is a "composite" force vector applied between the pinion and the gear members, which contains three linear force components and three torque components in world coordinates and $\Delta D_w$ is a matrix representing deflection of the gear housing relative to the pinion due to the applied "load" $F_w$.

The compliance matrix [SCM] represents a linear relationship between vector $F_w$ and $\Delta D_w$ based on spatial system stiffness. This matrix can be obtained experimentally by applying a known load to the system and measuring the developed deflection, as illustrated in FIG. 39 and described above, or alternatively, determined by known finite element analysis modeling techniques. Matrix [SCM] can be considered as a transfer function and must be presented as a function of frequency as well. This measurement can be done by applying a load in the form of a set of independent orthogonal signals wherein each signal is a "white noise" signal to each degree of freedom input, and then measuring the subsequent gear system response.

The suspension system deflection or alternatively stated the relationship between actuator displacement and motion of the spindle can be defined with respect to a Jacobian matrix [J] as follows:

$$\Delta W = [J][\Delta U]$$

where $\Delta U$ is a vector of actuator disturbances and $\Delta W$ is a vector of spindle displacement in world coordinates including three linear or translational motions and three angular motions.

The same Jacobian matrix [J] can then be used to correlate the results between the forces developed in actuators and forces induced at the spindle as:

$$[J^T][F_w] = [F_a]$$

where $F_a$ is a vector of applied actuator forces and $F_w$ is a vector in six degrees of freedom of world spindle forces (three linear force components and three torque components). The force $F_w$ can then be expressed as:

$$F_w = [JJ^T]^{-1}[J]F_a$$

Using the force instrument illustrated in FIG. 39 and described above to "clamp" the gear spindle to the frame to provide a stationary condition and keep the world vector displacement of the spindle equal to zero, forces can be applied through the actuators to measuring the force $F_a$ and recreate a world force $F_w$ and a second compliance matrix [TCM] of the test/suspension system which also is a function of frequency. The same result can be achieved by using a set of accelerometers attached to the spindles.

Assuming low frequency content in the measured signals, the world forces $F_w$ between the gear and the pinion can be determined by:

$$F_w = [JJ^T]^{-1}[J]F_a$$

An estimate of the deflection of the spindle world position $\Delta D_w$ due to this world force $F_w$ upon the gear housing and deflection thereof, which is represented as the compliance matrix [SCM], can then be made according to the following relationship:

$$\Delta D_w = [SCM][F_w] = [SCM][JJ^T]^{-1}[J]F_a$$

In addition, an estimate of the deflection of the spindle world position $\Delta S_w$ due to this world force $F_w$ upon the suspension system and deflection or "sag" thereof, which is represented as the suspension compliance matrix [TCM], can then be made according to the following relationship:

$$\Delta S_w = [TCM][F_w] = [TCM][JJ^T]^{-1}[J]F_a$$

In order to find out the difference between desired deflection of the gear inside the housing $\Delta D_w$ and real deflection on the tester $\Delta S_w$ under the same load the following relationship is used:

$$\Delta_w = \Delta D_w - \Delta S_w = \{[SCM] - [TCM]\}[JJ^T]^{-1}[J]F_a$$

Finally, the difference in position of the spindle due to the housing deflection and suspension sag is provided by adjusting actuator displacement $\Delta u$ as follows:

$$\Delta_u = [J^T J]^{-1}[J^T]\Delta_w = [J^T J]^{-1}[J^T]\{[SCM] - [TCM]\}[JJ^T]^{-1}[J]F_a$$

From the last equation it is clear that if housing compliance matrix [SCM] is the same as the suspension compliance matrix [TCM], then no additional compensation is needed. However, since it is impossible to build a gear tester with suspension sag that exactly equals the deflection of every gear housing ever built, a certain degree of compensation is needed.

It should be understood that the Matrix [TCM] must be always presented in the above equation to prevent the system from unwanted "sagging" and to keep tester suspension as stiff as possible. Furthermore, the matrix [SCM] must be obtained if the desired (not absolute stiff) housing conditions must be simulated. Finally, the above described compensation techniques can be applied throughout the frequency spectrum, starting from DC (or low frequency contents) and extending this technique to much higher frequencies that are within the actuator system capability range and by utilizing existing hardware and software on the market today.

Although the present invention has been described with reference to preferred embodiments, workers skilled in the art will recognize that changes may be made in form and detail without departing from the spirit and scope of the invention.

What is claimed is:

1. An apparatus for testing and adjusting a position of a first gear with respect to a second gear relative to three substantially orthogonal axes, the apparatus comprising:
   a frame rotatably supporting the first gear;
   a carriage rotatably supporting the second gear about a central axis of the second gear;
   actuator means connected to the frame for supporting the carriage relative to the first gear, the actuator means moving the carriage so that the second gear is linearly displaced along the three substantially orthogonal axes and is rotationally displaced about at least one of the axes; and
   sensing means to determine relative displacement of the second gear with respect to the first gear.

2. The apparatus of claim 1 wherein the actuator means further moves the carriage so that the second gear moves rotationally about each substantially orthogonal axis.

3. The apparatus of claim 1 wherein the actuator means comprises a plurality of actuators connected to the frame and supporting the carriage.

4. The apparatus of claim 3 wherein the actuator means comprises at least four actuators connected to the frame and the carriage.

5. The apparatus of claim 4 wherein the actuator means comprises six actuators.

6. The apparatus of claim 5 wherein the actuators control displacement of the carriage in only four selected degrees of freedom.

7. The apparatus of claim 1 wherein the actuator means comprises three actuators substantially parallel to the central axis of the second gear and three actuators substantially perpendicular to the central axis of the second gear.

8. The apparatus of claim 1 and further comprising loading means connected to the second gear to apply selective brake loads.

9. The apparatus of claim 1 and further comprising control means connected to the actuator means and to the sensing means, the control means controlling displacement of the second gear.

10. The apparatus of claim 9 wherein the control means controls the actuator means to simulate expected displacement of the second gear from the first gear.

11. The apparatus of claim 10 wherein the control means controls the actuator means to simulate deflection of a gear housing.

12. The apparatus of claim 1 wherein the actuator means moves the second gear away from the first gear to allow the removal of the second gear from the carriage.

13. The apparatus of claim 12 wherein the actuator means includes an actuator for moving the second gear substantially parallel to the central axis of the second gear.

14. The apparatus of claim 13 wherein the actuator comprises:
   connecting means connected to the carriage;
   a first displacement means joined to the connecting means for moving the second gear away from the first gear to allow the removal of the second gear from the carriage; and
   second displacement means joined to the connecting means for moving the second gear to adjust engagement of the second gear with the first gear.

15. The apparatus of claim 14 wherein the first displacement means comprises an actuator housing having a first selectively pressurized chamber and a first piston drivably joined to the connecting means and sealingly disposed in the chamber, the first piston moving upon pressurization of the chamber; and wherein the actuator housing has a second selectively pressurized chamber and the second displacement means comprises a second piston drivably joined to the connecting means and sealingly disposed in the second chamber, the second piston moving upon pressurization of the second chamber.

16. The apparatus of claim 15 wherein the first chamber is pressurized substantially higher than the second chamber to securely locate the first piston in a stationary position when the second chamber is pressurized to adjust engagement of the second gear with the first gear.

17. The apparatus of claim 1 wherein the first gear is fixedly adjustable to the frame.

18. The apparatus of claim 17 wherein the first gear is rotatably mounted in a support housing having a recess formed in a lower surface that engages an upper surface of the frame, the recess selectively pressurized to lift the support housing from the frame to move the first gear relative to the frame.

19. The apparatus of claim 1 wherein the carriage and the actuator means oscillate with an amplitude substantially at a resonant frequency, and the apparatus further comprises damping means connected to the carriage to reduce the amplitude at the resonant frequency.

20. The apparatus of claim 19 wherein the damping means comprises a tuned mass damper.

21. The apparatus of claim 1 and further comprising aligning means to align an axis of rotation of the first gear with the central axis of the second gear.

22. The apparatus of claim 21 wherein the frame includes a spindle for rotatably supporting the first gear, and the aligning means includes a support mounted to the spindle and a position sensor connected to the support, the position sensor used to determine the position of the central axis of the second gear.

23. The apparatus of claim 22 wherein the aligning means includes a light source mounted to the carriage to represent the position of the central axis of the second gear, and wherein the position sensor includes light receiving means to receive light from the light source.

24. A method for testing the running of a gear set comprising a first gear and a second gear relative to three substantially orthogonal axes, the method comprising:
providing a frame for rotatably supporting the first gear, a carriage for rotatably supporting the second gear for rotation about a central axis of the second gear, actuator means connected to the frame for supporting the carriage relative to the first gear, and sensing means to determine relative displacement of the second gear with respect to the first gear;
adjusting the first gear relative to the frame to allow the first gear to rotatably mesh with the second gear; and
operating the actuator means as the gear set is rotated to displace the second gear linearly along the three substantially orthogonal axes and to displace the second gear rotationally about at least one of the orthogonal axes to adjust the gear mesh between the first gear and the second gear.

25. The method of claim 24 wherein the step of providing includes providing a second carriage for rotatably supporting the first gear, the second carriage having a recess in a lower surface that engages an upper surface of the frame, and the step of adjusting includes selectively pressurizing the recess to lift the second carriage from the frame to move the first gear relative to the frame.

26. The method of claim 24 wherein the step of operating moves the second gear rotationally about each substantially orthogonal axis.

27. The method of claim 26 and further including the step of operating the actuator means to move the second gear away from the first gear to allow the second gear to be removed from the carriage.

28. A method of testing a set of gears including a pinion and a gear that are positioned for rotation about separate axes at a known included angle relative to each other and comprising the steps of:
fixing a pinion spindle for rotation about an axis to drive the pinion about said axis, and having the pinion spindle fixed relative to a frame;
providing a gear support carriage for supporting the gear for rotation about a gear spindle axis relative to the frame, said supporting includes supporting the gear for movement in at least four degrees of freedom comprising linear displacement in a line parallel to the spindle pinion axis; linear displacement in a line perpendicular to the spindle pinion axis; rotational displacement about the spindle pinion axis; and rotational displacement about an axis perpendicular to the spindle pinion axis; and sensing means to determine relative displacement of the second gear with respect to the first gear; and
establishing the gear support carriage at nominal settings relative to the pinion and adjusting the gear support carriage for compensation for errors in the controlled degrees of freedom and utilizing servocontrolled actuators for making such adjustment.

29. The method of claim 28 and including the step of supporting the actuators relative to the frame and coupling a movable element of the actuators to the gear support carriage through fixed length struts.

30. The method of claim 28 and including the step of providing load cell means for determining the load exerted on the gear support carriage by each of the struts.

31. The method of claim 28 and including the step of supporting the gear support carriage relative to the pinion while driving the pinion and loading the gear, and adjusting the gear support carriage to different positions to determine a change in parameter of the running pinion and gear.

* * * * *

UNITED STATES PATENT AND TRADEMARK OFFICE
CERTIFICATE OF CORRECTION

PATENT NO. : 5,307,676
DATED : May 3, 1994
INVENTOR(S) : Yevsey Gutman

It is certified that error appears in the above-indentified patent and that said Letters Patent is hereby corrected as shown below:

Column 19, line 66, cancel $$" H = \{'I^{(og)} - Q\bar{a}_t^{(g)}\}_x "$$

and insert $$-- H = \{\bar{I}_t^{(o_g)} - Q\bar{a}_t^{(g)}\}_x --$$

Signed and Sealed this

Thirteenth Day of September, 1994

Attest:

BRUCE LEHMAN

Attesting Officer     *Commissioner of Patents and Trademarks*